(12) United States Patent
He et al.

(10) Patent No.: US 11,886,457 B2
(45) Date of Patent: Jan. 30, 2024

(54) AUTOMATIC TRANSFORMATION OF DATA BY PATTERNS

(71) Applicant: Microsoft Technology Licensing, LLC, Redmond, WA (US)

(72) Inventors: Yeye He, Redmond, WA (US); Surajit Chaudhuri, Kirkland, WA (US); Zhongjun Jin, Ann Arbor, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 16/887,564

(22) Filed: May 29, 2020

(65) Prior Publication Data

US 2021/0374134 A1 Dec. 2, 2021

(51) Int. Cl.
| | | |
|---|---|---|
| *G06F 16/25* | (2019.01) | |
| *G06F 16/2453* | (2019.01) | |
| *G06F 16/21* | (2019.01) | |
| *G06F 16/248* | (2019.01) | |
| *G06F 18/21* | (2023.01) | |

(52) U.S. Cl.
CPC .......... *G06F 16/254* (2019.01); *G06F 16/213* (2019.01); *G06F 16/248* (2019.01); *G06F 16/24539* (2019.01); *G06F 18/2178* (2023.01)

(58) Field of Classification Search
CPC ............. G06F 16/24539; G06F 16/213; G06F 16/248; G06K 9/6263
See application file for complete search history.

(56) References Cited

U.S. PATENT DOCUMENTS

| | | | | |
|---|---|---|---|---|
| 7,080,225 | B1* | 7/2006 | Todd ....................... | G06F 3/061 |
| | | | | 711/6 |
| 2008/0104579 | A1* | 5/2008 | Hartmann ............. | G06F 40/154 |
| | | | | 715/239 |
| 2015/0261881 | A1* | 9/2015 | Wensel ................. | G06F 9/4494 |
| | | | | 707/798 |
| 2016/0378675 | A1* | 12/2016 | Giuliani .............. | G06F 11/3688 |
| | | | | 711/206 |
| 2017/0118466 | A1* | 4/2017 | Nakagami ............ | H04N 19/134 |

(Continued)

OTHER PUBLICATIONS

"International Search Report & Written Opinion Issued in PCT Application No. PCT/US21/027577", dated Jun. 30, 2021, 12 Pages.

(Continued)

*Primary Examiner* — Dinku W Gebresenbet
*Assistant Examiner* — Dustin D Eyers
(74) *Attorney, Agent, or Firm* — Workman Nydegger

(57) ABSTRACT

A transform-by-pattern (TBP) system is configured to proactively suggest relevant TBP programs based on inputted source dataset and target dataset without requiring users typing in examples. The TBP system has access to multiple TBP programs, each of which includes a combination of a source pattern, a target pattern, and a transformation program that is configured to transform data that fits into the target pattern into data that fits into the source pattern. When a source dataset and a target dataset are received from a user, the TBP system identifies a subset of the source dataset and a subset of the target dataset as related data. The TBP system then identifies one or more applicable TBP programs amongst the multiple TBP programs, and suggest or apply at least one of the one or more applicable TBP programs.

21 Claims, 18 Drawing Sheets

(56) References Cited

U.S. PATENT DOCUMENTS

| | | | |
|---|---|---|---|
| 2018/0032490 | A1 | 2/2018 | Hill et al. |
| 2018/0075115 | A1 | 3/2018 | Murray et al. |
| 2018/0081923 | A1* | 3/2018 | Cheung ............... G06F 16/2462 |
| 2018/0314705 | A1 | 11/2018 | Griffith et al. |
| 2018/0314975 | A1* | 11/2018 | Zang ....................... G06N 20/20 |
| 2018/0315417 | A1* | 11/2018 | Flaks .................... G10L 15/063 |
| 2018/0336200 | A1* | 11/2018 | Lim ..................... G06F 16/9535 |
| 2019/0258677 | A1* | 8/2019 | Beedgen ........... G06F 16/90335 |
| 2019/0346297 | A1* | 11/2019 | Lekivetz ............. G06F 11/2025 |

OTHER PUBLICATIONS

"Advanced Data Transformation", Retrieved From: https://web.archive.org/web/20191001174246/https://www.informatica.com/products/data-integration/advanced-data-transformation.html#fbid=, Oct. 1, 2019, 6 Pages.

"AWS Glue: Writing Custom Classifiers", Retrieved From:https://web.archive.org/web/20171201115859/http://docs.aws.amazon.com/glue/latest/dg/custom-classifier.html, Dec. 1, 2017, 6 Pages.

"DateTime.FromOADate(Double) Method", Retrievd From: https://docs.microsoft.com/en-us/dotnet/api/system.datetime.fromoadate?redirectedfrom=MSDN&view=netframework-4.8#System_DateTime_FromOADate_System_Double_, Retrieved On: Jun. 8, 2020, 3 Pages.

"DateTime.Parse Method", Retrieved From: https://docs.microsoft.com/en-us/dotnet/api/system.datetime.parse?view=netcore-3.1, Retrieved On: Jun. 8, 2020, 23 Pages.

"Date TimeFormatInfo.GetAllDateTimePatterns Method", Retrieved From: https://docs.microsoft.com/en-us/dotnet/api/system.globalization.datetimeformatinfo.getalldatetimepatterns?view=netframework-4.8, Retrieved On: Jun. 8, 2020, 12 Pages.

"Dresden Web Table Corpus", Retrieved From: https://web.archive.org/web/20160404054130/https://wwwdb.inf.tu-dresden.de/misc/dwtc/, Apr. 4, 2016, 2 Pages.

"JoinBuilder Class", Retrieved From: https://web.archive.org/web/20191223144132/https://docs.microsoft.com/en-us/python/api/azureml-dataprep/azureml.dataprep.api.builders.joinbuilder?view=azure-dataprep-py, Dec. 23, 2019, 4 Pages.

"Standardize Using Patterns", Retrieved From: https://docs.trifacta.com/display/SS/Standardize+Using+Patterns#StandardizeUsingPatterns-PatternsbyExample, Retrieved On : Jun. 8, 2020, 4 Pages.

"Stop Automatically Changing Numbers to Dates", Retrieved From: https://web.archive.org/web/20190102042032/https://support.office.com/en-us/article/stop-automatically-changing-numbers-to-dates-452bd2db-cc96-47d1-81e4-72cec11c4ed8, Jan. 2, 2019, 3 Pages.

"Web Data Commons—Web Table Corpora", Retrieved From: https://web.archive.org/web/20190502175326/http://webdatacommons.org/webtables/, May 2, 2019, 3 Pages.

"Web Data Commons—Web Tables", Retrieved From: https://web.archive.org/web/20150302062935/http://km.aifb.kit.edu/sites/webdatacommons/webtables/index.html, Mar. 2, 2015, 5 Pages.

Abedjan, et al., "DataXFormer: A Robust Transformation Discovery System", In Proceedings of 32nd International Conference on Data Engineering (ICDE), May 16, 2016, pp. 1134-1145.

Abedjan, et al., "Detecting Data Errors: Where are We and What needs to be done?", In Proceedings of the VLDB Endowment, vol. 9, Issue 12, Aug. 2016, pp. 993-1004.

Abedjan, et al., "Profiling Relational Data: A Survey", In VLDB Journal, vol. 24, Issue 4, Jun. 2, 2015, pp. 557-581.

Afrati, et al., "Repair Checking in Inconsistent Databases: Algorithms and Complexity", In Proceedings of the 12th International Conference on Database Theory, Mar. 23, 2009, pp. 31-41.

Berti-Equille, et al., "Discovery of Genuine Functional Dependencies from Relational Data with Missing Values", In Proceedings of the VLDB Endowment, vol. 11, Issue 8, Apr. 2018, pp. 880-892.

Bohannon, et al., "A Cost-Based Model and Effective Heuristic for Repairing Constraints by Value Modification", In Proceedings of the ACM SIGMOD International Conference on Management of Data, Jun. 14, 2005, pp. 143-154.

Bowers, et al., "An Ontology-Driven Framework for Data Transformation in Scientific Workflows", In Proceedings of International Workshop on Data Integration in the Life Sciences, Mar. 25, 2004, 16 Pages.

Buchbinder, et al., "Submodular Maximization with Cardinality Constraints", In Proceedings of the Twenty-Fifth Annual ACM-SIAM Symposium on Discrete Algorithms, Jan. 5, 2014, pp. 1433-1452.

Chakrabarti, et al., "Data Services Leveraging Bing's Data Assets", In Journal of IEEE Data Engineering Bulletin, vol. 39, Issue 3, Sep. 2016, pp. 15-28.

Chiang, et al., "Discovering Data Quality Rules", In Proceedings of the VLDB Endowment, vol. 1, Issue 1, Aug. 23, 2008, pp. 1166-1177.

Chu, et al., "Discovering Denial Constraints", In Proceedings of the VLDB Endowment, vol. 6, Issue 13, Aug. 26, 2013, pp. 1498-1509.

Chu, et al., "Holistic Data Cleaning: Putting Violations into Context", In Proceedings of 29th International Conference on Data Engineering (ICDE), Apr. 8, 2013, pp. 458-469.

Chu, et al., "KATARA: A Data Cleaning System Powered by Knowledge Bases and Crowdsourcing", In Proceedings of the ACM SIGMOD International Conference on Management of Data, May 31, 2015, pp. 1247-1261.

Cofsky, Amanda, "Power BI Desktop June Feature Summary", Retrieved From: https://powerbi.microsoft.com/en-us/blog/power-bi-desktop-june-feature-summary/#addColumn, Jun. 12, 2017, 37 Pages.

Cong, et al., "Improving Data Quality: Consistency and Accuracy", In Proceedings of the VLDB Endowment, Sep. 23, 2007, pp. 315-326.

Dasu, et al., "Mining Database Structure; or, How to Build a Data Quality Browser", In Proceedings of ACM SIGMOD International Conference on Management of Data, Jun. 4, 2002, pp. 240-251.

Dessloch, et al., "Orchid: Integrating Schema Mapping and ETL", In Proceedings of 24th International Conference on Data Engineering, Apr. 7, 2008, pp. 1307-1316.

Dhamankar, et al., "iMAP: Discovering Complex Semantic Matches Between Database Schemas", In Proceedings of the ACM SIGMOD International Conference on Management of Data, Jun. 13, 2004, 12 Pages.

Doshi, Anish, "Transform by Example: Your Data Cleaning Wish is Our Command", Retrieved From: https://www.trifacta.com/blog/transform-by-example-your-data-cleaning-wish-is-our-command/, Jun. 18, 2019, 9 Pages.

Fisher, et al., "From Dirt to Shovels Fully Automatic Tool Generation from Ad Hoc Data", In Journal of ACM SIGPLAN Notices, vol. 43, Issue 1, Jan. 7, 2008, pp. 421-434.

Golab, et al., "Data Auditor: Exploring Data Quality and Semantics using Pattern Tableaux", In Proceedings of the VLDB Endowment, vol. 3, Issue 2, Sep. 13, 2010, pp. 1641-1644.

Gulwani, Sumit, "Automating String Processing in Spreadsheets Using Input-Output Examples", In Journal of ACM Sigplan Notices, vol. 46, Issue 1, Jan. 26, 2011, pp. 317-329.

Hare, et al., "Forecast Snapshot: Self-Service Data Preparation, Worldwide, 2016", Retrieved from: https://www.gartner.com/doc/3204817/, Feb. 9, 2016, 3 Pages.

He, et al., "Transform-Data-By-Example (TDE): An Extensible Search Engine for Data Transformations", In Proceedings of the VLDB Endowment, vol. 11, Issue 10, Jun. 1, 2018, pp. 1165-1177.

Heer, et al., "Predictive Interaction for Data Transformation", In Proceedings of 7th Biennial Conference on Innovative Data Systems Research, Jan. 4, 2015, 7 Pages.

Hellerstein, Joseph M., "Quantitative Data Cleaning for Large Databases", In Journal of United Nations Economic Commission for Europe (UNECE), Feb. 27, 2008, 42 Pages.

Hermann, et al., "Elasticsearch—Grok Patterns at Master", Retrieved from: https://github.com/elastic/elasticsearch/blob/master/libs/grok/src/main/resources/patterns/grok-patterns, Feb. 4, 2020, 3 Pages.

Ilyas, et al., "CORDS: Automatic Discovery of Correlations and Soft Functional Dependencies", In Proceedings of ACM SIGMOD International Conference on Management of Data, Jun. 13, 2004, 12 Pages.

(56) References Cited

OTHER PUBLICATIONS

Jin, et al., "CLX: Towards Verifiable PBE Data Transformation", In Repository of arXiv:1803.00701v3, Oct. 13, 2018, 16 Pages.

Jin, et al., "Foofah: Transforming Data by Example", In Proceedings of the ACM International Conference on Management of Data, May 14, 2017, pp. 683-698.

Khot, Subhash, "Ruling Out PTAS for Graph Min?Bisection, Dense k?Subgraph, and Bipartite Clique", In SIAM Journal on Computing, vol. 36, Issue 4, Dec. 15, 2006, pp. 1025-1071.

Kimball, et al., "The Data Warehouse ETL Toolkit: Practical Techniques for Extracting, Cleaning, Conforming, and Delivering Data", Published by John Wiley & Sons, Apr. 2011, 528 Pages.

Kivinen, et al., "Approximate Inference of Functional Dependencies From Relations", In Journal of Theoretical Computer Science, vol. 149, Issue 1, Sep. 18, 1995, pp. 129-149.

Korte, et al., "Combinatorial Optimization", In Published of Springer, vol. 21, 2012, 664 Pages.

Manning, et al., "An Introduction to Information Retrieval", In Published of Cambridge University Press, 2009, 569 Pages.

McBrien, et al., "Data Integration by Bi-Directional Schema Transformation Rules", In Proceedings 19th International Conference on Data Engineering (Cat. No. 03CH37405), Mar. 5, 2003, pp. 227-238.

Oppenheimer, Diego, "Flash Fill", Retrieved From: https://www.microsoft.com/en-us/microsoft-365/blog/2012/08/09/flash-fill/, Aug. 9, 2012, 12 Pages.

Rahm, et al., "Data Cleaning: Problems and Current Approaches", In Journal of IEEE Data Engineering Bulletin, vol. 23, Issue 4, Dec. 2000, pp. 3-13.

Raman, et al., "Potter's Wheel: An Interactive Data Cleaning System", In Proceedings of the 27th VLDB Conference, Sep. 2001, 10 Pages.

Rekatsinas, et al., "HoloClean: Holistic Data Repairs with Probabilistic Inference", In Proceedings of the VLDB Endowment, vol. 10, issue 11, Aug., 2017, pp. 1190-1201.

Simitsis, et al., "Optimizing ETL Processes in Data Warehouses", In Proceedings of 21st International Conference on Data Engineering, Apr. 5, 2005, 12 pages.

Singh, Rishabh, "BlinkFill: Semi-supervised Programming by Example for Syntactic String Transformations", In Proceedings of the VLDB Endowment, vol. 9, Issue 10, Jun. 2016, pp. 816-827.

Vashisth, et al., "Gartner: Market Guide for Self-Service Data Preparation", Retrieved From: https://www.gartner.com/en/documents/3418832/market-guide-for-self-service-data-preparation, Aug. 25, 2016, 2 Pages.

Wang, et al., "Uni-Detect: A Unified Approach to Automated Error Detection in Tables", In Proceedings of the International Conference on Management of Data, Jun. 30, 2019, pp. 811-828.

Yakout, et al., "Don't be Scared: Use Scalable Automatic Repairing with Maximal Likelihood and Bounded Changes", In Proceedings of the ACM SIGMOD International Conference on Management of Data, Jun. 22, 2013, pp. 553-564.

Yan, et al., "Coded: Column-Oriented Data Error Detection with Statistical Constraints", Retrieved From: https://www.cs.sfu.ca/~jnwang/papers/TR-CODED.pdf, Retrieved on: Jun. 9, 2020, 16 pages.

Zhu, et al., "Auto-Join: Joining Tables by Leveraging Transformations", In Proceedings of the VLDB Endowment, vol. 10, Issue 10, Jun., 2017, pp. 1034-1045.

* cited by examiner

| TBP-id | Source-pattern ($P_s$) | Target-pattern ($P_t$) | ($T$) |
|---|---|---|---|
| TBP-1 | \<letter\>{3}. \<digit\>{2}. \<digit\>{4} | \<digit\>{4}.\<digit\>{2}.\<digit\>{2} | ... |
| TBP-2 | (\<digit\>{3}) \<digit\>{3}-\<digit\>{4} | \<letter\>{3}-\<digit\>{3}-\<digit\>{4} | ... |
| TBP-3 | \<digit\>+ \<num\> \<letter\>{1}, \<digit\>+ \<num\> \<letter\>{1} | \<letter\>{1}\<digit\>+ \<num\>' \<letter\>{1}\<digit\>+ \<num\> | ... |
| TBP-7 | \<digit\>{4}/\<digit\>{2}/\<digit\>{2} | \<letter\>{3} \<digit\>{2} | ... |
| TBP-8 | \<num\> kg | \<num\> lb | ... |
| TBP-9 | \<num\> lb | \<num\> lb \<num\> oz | ... |
| TBP-15 | \<num\>+ kg | \<num\>2.!! | ... |
| TBP-16 | \<letter\>+ de \<digit\>{4} | \<digit\>{4} | ... |

| Timestamp | Phone | S-coordinates |
|---|---|---|
| 2019-12-23 | (425) 882-8080 | (38°57'N, 95°15'W) |
| 2019-12-24 | (425) 882-8080 | (38°61'N, 95°21'W) |
| 2019-12-23 | (206) 876-1800 | (39°19'N, 95°18'W) |
| 2019-12-24 | (206) 876-1800 | (39°26'N, 95°23'W) |
| 2019-12-23 | (206) 903-8010 | (39°42'N, 96°38'W) |

| Timestamp | Phone | R-coordinates |
|---|---|---|
| Nov. 16 2019 | 650-853-1300 | N37°31' W122°14' |
| Nov. 17 2019 | 650-853-1300 | N37°18' W122°19' |
| Nov. 16 2019 | 425-421-1225 | N37°48' W122°17' |
| Nov. 17 2019 | 425-421-1225 | N37°60' W123°08' |
| Nov. 16 2019 | 650-253-0827 | N37°01' W123°72' |

| KILOGRAMS | POUNDS |
|---|---|
| 119.73 kg | 263.9550264503 lb |
| 119.75 kg | 263.9991816578 lb |
| 119.8 kg | 264.1093474426 lb |
| 119.82 kg | 264.1534391334 lb |
| 119.85 kg | 264.2195767196 lb |
| 118.9 kg | 264.5798059947 lb |
| 119.99 kg | 264.5378218694 lb |
| 120 kg | 264.5502645503 lb |

| Number | Name |
|---|---|
| 608-344-4270 | 608-344-4278 |
| 608-344-4280 | 608-344-4288 |
| 608-344-4285 | 608-344-4283 |
| 608-344-4290 | 608-344-4298 |
| 608-344-4293 | 608-344-4283 |
| 608-344-4294 | 608-344-4284 |

*Fig. 8A*

| CCT-id | Input-column ($C$) | Output-column ($C'$) | Program ($T$) |
|---|---|---|---|
| CCT-1 | ($C_1$) "Born" = {"02/22/1732", "10/30/1735", ...} | ($C_1'$) "Date of birth" = {"February 22, 1732", "October 30, 1735", ...} | Listing_1 |
| CCT-2 | ($C_2$) "Date of birth" = {"February 22, 1732", "October 30, 1735", ...} | ($C_2'$) "Born" = {"02/22/1732", "10/30/1735", ...} | |
| CCT-3 | ($C_3$) "Died" = {"02/14/1799", "07/04/1826", ...} | ($C_3'$) "Date of birth" = {"February 22, 1732", "October 30, 1735", ...} | |
| CCT-4 | ($C_4$) "Date" = {"11/01/2019", "12/01/2019", ...} | ($C_4'$) "Date-2" = {"November 01, 2019", "December 01, 2019", ...} | Listing_1 |
| CCT-5 | ($C_5$) "Name" = {"Washington, George", "Adam, John", ...} | ($C_5'$) "Date of birth" = {"February 22, 1732", "October 30, 1735", ...} | 0 |
| ⋮ | ⋮ | ⋮ | ⋮ |

Listing 1

```
public string T(string input)
{ var ret = System.DateTime.Parse(input);
  return ret.Month-Str
    + "/" + ret.Day
    + "/" + ret.Year;
}
```

Prior Art

AUTOMATIC TRANSFORMATION OF DATA BY PATTERNS

BACKGROUND

Data transformation is an important and long-standing problem in the field of data management. For decades, expert users like developers or data engineers painstakingly write ad-hoc programs/scripts to transform data from one format to another, in a wide range of applications such as extracting, transforming, loading (also called ETL) and data integration.

Recently, in a broader trend known as "self-service data preparation," non-technical users such as business analysts (e.g., in Excel or Tableau) increasingly need to manipulate data and perform tasks like data transformation. However, unlike expert users, these non-technical users lack the expertise to write programs. Democratizing data transformation for the non-technical users (e.g., without asking them to write code) has become increasingly important.

In response to this demand, "transform-by-example" (TBE) paradigm was developed for data transformation. In a TBE system, users provide a few paired input/output examples to demonstrate a desired transformation task. The TBE system would then search for programs consistent with all given examples, from a predefined space of candidate programs. This has led to a fruitful line of research on TBE, advancing the state-of-the-art and producing real impacts on commercial systems.

Figure 18:
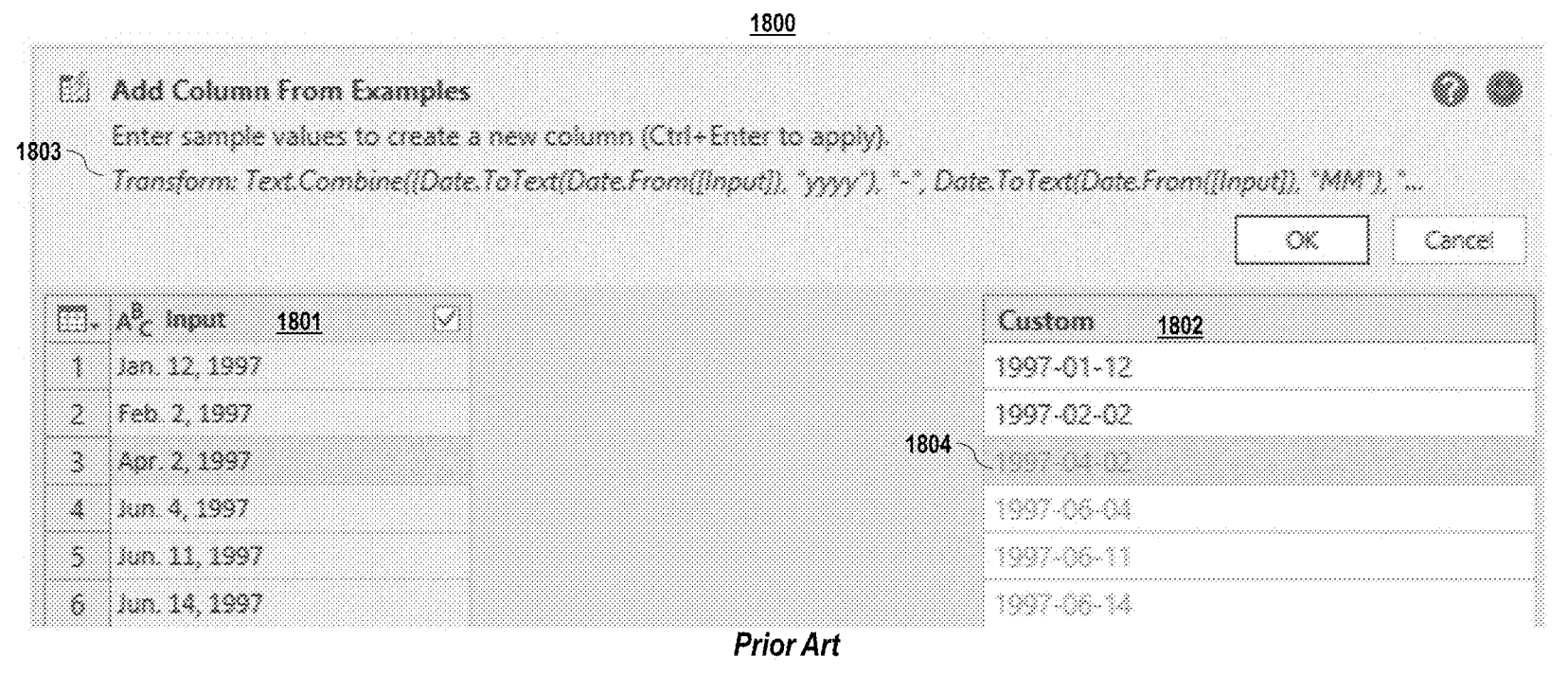

FIG. 18 illustrates an example spreadsheet 1800 that provides a TBE feature called "Add-Column-From-Examples." The example spreadsheet has an "Input" column 1801 on the left with a list of date-time strings. In this case, a user invokes the TBE feature, and enters two output examples (199701-12 and 1997-02-02) in the "Custom" column 1802 on the right, and demonstrates a desired transformation for the corresponding input values. The TBE system then synthesizes a transformation program consistent with the two given input/output examples, which is shown within the transformation definition field 1803. The TBE system invokes multiple functions, including Text.Combine, Date.ToText, etc. Furthermore, a preview of the output for remaining values may be shown as represented within the Custom column 1802 underneath the two output examples (see region 1804), which can help non-technical users to verify the correctness of the transformation.

While the TBE paradigm clearly helps non-technical users in spreadsheet environments, the need for users to manually identify columns for transformation programs, and then enter input/output examples, still burdens users in many applications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The principles described herein disclose a new transform-by-pattern (TBP) system (hereinafter may also be referred to as "the system") that can proactively suggest relevant TBP programs based on input/output datasets without requiring users typing in examples. The embodiments described herein are related to systems and methods for generating a plurality of TBP programs and/or automatic transformation of data by patterns using the generated plurality of TBP programs. The process of generating TBP programs can be performed offline at the service provider's site. Once the TBP programs are generated, they can then be made available online to users for automatic transformation of user data.

Each TBP program includes a combination (e.g., a triple) of a source pattern, a target pattern, and a transformation program that is configured to transform data that fits into the target pattern into data that fits into the source pattern. When a source dataset and a target dataset are received, the system identifies a subset of the source dataset (e.g., a column of the source dataset) and a subset of the target dataset (e.g., a column of the target dataset) as related data. Based on the identified related data, the system identifies one or more applicable TBP programs amongst the plurality of TBP programs. A TBP program is applicable to the related data, when at least one data unit of the subset of the source dataset (e.g., a row of the column of the source table) fits into the source pattern of the TBP program, and at least one data unit of the subset of the target dataset (e.g., a row of the column of the target table) fits into the target pattern of the TBP program. The system then suggests or applies the one or more applicable TBP programs to the user.

In some embodiments, the applying the one or more TBP programs includes selecting one of the one or more applicable TBP programs, and using a transformation program of the selected TBP program to automatically transform the subset of the target data to transformed data. The transformed data may include (are but not limited to) (1) a transformed subset of the target dataset that fits into the source pattern of the selected TBP program, (2) a transformed target dataset including the transformed subset of the target dataset, and/or (3) an integrated dataset including the source dataset and the transformed target dataset.

There are many ways that the system can learn or generate the plurality of TBP programs. In some embodiments, the system is configured to learn TBP programs from TBE query logs that contains users input and output datasets. Based on the users input and output datasets, one or more TBP programs may be learned or identified. For each of the identified one or more TBP programs, at least a pair of user input dataset and user output dataset fit into a respective source pattern and target pattern of the TBP program, and a corresponding transformation program of the TBP program is configured to transform the user input dataset into the user output dataset.

In some embodiments, the system is configured to learn or generate TBP programs from related datasets. Such related datasets may be obtained from various sources, such as query logs of a search engine and/or intra-wiki links. For example, a same search query may generate many pages of results, including many related tables. As another example, wiki pages (e.g., Wikipedia pages) include many intra-wiki links, each of which points to another related wiki page. These related pages linked by intra-wiki links may contain related tables. The related tables from search results and/or intra-wiki links can be obtained by crawling search results and/or wiki pages.

Once the related datasets are obtained, the system first pairs two subsets (i.e., a first subset of dataset and a second subset of dataset) of the related datasets. The first subset of dataset and the second subset of dataset may be from a same dataset or different dataset of the related datasets. The system then links one or more data units of the first subset with one or more units of the second subset. Each of the one or more data units of the subset is linked with one of the one or more data units of the second subset. The system then identifies one or more TBP programs that are applicable to the linked data units of the first subset and second subset. Each of the one or more TBP programs is applicable to transform the linked data unit of the first subset to the corresponding linked data units of the second subset.

In some embodiments, an existing TBE system may also be leveraged to identify the applicable transformation programs from the related datasets obtained from resources that are different from user queries. For example, the identifying the one or more transformation programs may include inputting the linked data units of the first subset and the second subset into a TBE system as one or more paired input/output examples to cause the TBE system to generate the one or more transformation programs.

Furthermore, the system may also identify one or more first patterns. For each of the one or more first patterns, at least one data unit of the first subset fits into the corresponding first pattern. Similarly, the computing system also identifies one or more second patterns; and for each of the one or more second patterns, at least one data unit of the second subset fits into the corresponding second pattern. For each of the one or more transformation programs, the one or more first patterns, and/or the one or more second patterns, a candidate TBP program can be formed. Each candidate TBP program includes a corresponding first pattern, a corresponding second pattern, and a corresponding transformation program. A large number of candidate TBP programs may be generated through this process.

From these candidate TBP programs, the system may then identify the suitable TBP programs. In some embodiments, for each candidate TBP program, the system applies corresponding TBP program to multiple pairs of source data units and target data units to generate a coverage score and/or an accuracy score. The coverage score indicates an applicability rate of the candidate TBP program. The accuracy score indicates an accuracy rate of the candidate TBP program. When the coverage score and/or the accuracy score is greater than a predetermined threshold, the candidate TBP program is then identified as a suitable TBP program.

In some embodiments, the system may further identify high-quality TBP programs amongst the candidate or suitable TBP programs. In some embodiments, the system uses the existing TBP programs to generate a directed graph. Each first pattern or second pattern of the TBP programs corresponds to a vertex of the directed graph, and each transformation program of the TBP programs corresponds to a directed edge.

Based on the directed graph, the computing system can then determine whether one or more special relationships exist amongst the TBP programs based on the graph and identify one or more high-quality TBP programs based on the determined one or more special relationships. The one or more special relationships include (but are not limited to) (1) a lossless inverse relationship between two TBP programs, and/or (2) a triangular equivalence relationship amongst three TBP programs. When a lossless inverse relationship between two TBP programs exists, the computing system identifies each of the two TBP programs as a high-quality TBP program. Similarly, when a triangular equivalence relationship amongst three TBP programs exists, the computing system identifies each of the three TBP programs as a high-quality TBP program.

In some cases (e.g., when a high accuracy (e.g., near 100%) is required), the system may select a predetermined number of top high-quality TBP programs and send the selected top high-quality TBP programs to a human curator to verify. For each of the predetermined number of high-quality TBP programs, the system may then receive and record a label from the human curator, indicating whether the corresponding high-quality TBP program is correct or incorrect.

Accordingly, the principles described herein are capable of systematically harvesting TBP programs (including high-quality TBP programs) using available data resources. The harvested TBP programs can then be used to perform many data management tasks (e.g., auto-unify, auto-repair, etc.) automatically without any or with very little human input.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 2 illustrates an example data structure including a plurality of TBP programs;

FIGS. 3A and 3B illustrate an example source dataset and target dataset;

FIGS. 4A through 4L illustrate several example tables that contain data inconsistencies;

FIG. 6 illustrates an example set of related data returned from a same search query;

FIGS. 8A and 8B illustrate two example tables, each of which includes related columns;

FIG. 9 illustrates an example table that records multiple input columns of a target table and multiple output columns of a source table;

FIG. 11 illustrates example source code corresponding to the transformation program synthesized by the process of FIG. 10;

FIG. 18 illustrates an example spreadsheet that provides a Transform-by-Example (TBE) feature.

DETAILED DESCRIPTION

The principles described herein disclose a new transform-by-pattern (TBP) system that can proactively suggest relevant TBP programs based on input/output data patterns (without users typing in examples). The embodiments described herein are related to systems and methods for generating a plurality of TBP programs and/or automatic transformation of data by patterns using the generated plurality of TBP programs. The process of generating TBP programs can be performed offline at the service provider's site. Once the TBP programs are generated, they can be made available online to users for automatic transformation of user data.

Each TBP program includes a combination (e.g., a triple) of a source pattern, a target pattern, and a transformation program that is configured to transform data that fits into the target pattern into data that fits into the source pattern. When a source dataset (e.g., a source table) and a target dataset (e.g., a target table) are received, the system identifies a subset of the source dataset (e.g., a column of the source table) and a subset of the target dataset (e.g., a column of the target table) as related data. Based on the identified related data, the system identifies one or more applicable TBP programs amongst the plurality of TBP programs. A TBP program is applicable to the related data, when at least one data unit of the subset of the source dataset fits into the source pattern of the TBP program, and at least one data unit of the subset of the target dataset fits into the target pattern of the TBP program. The system then suggests or applies the one or more applicable TBP programs to the target dataset.

Figure 1:
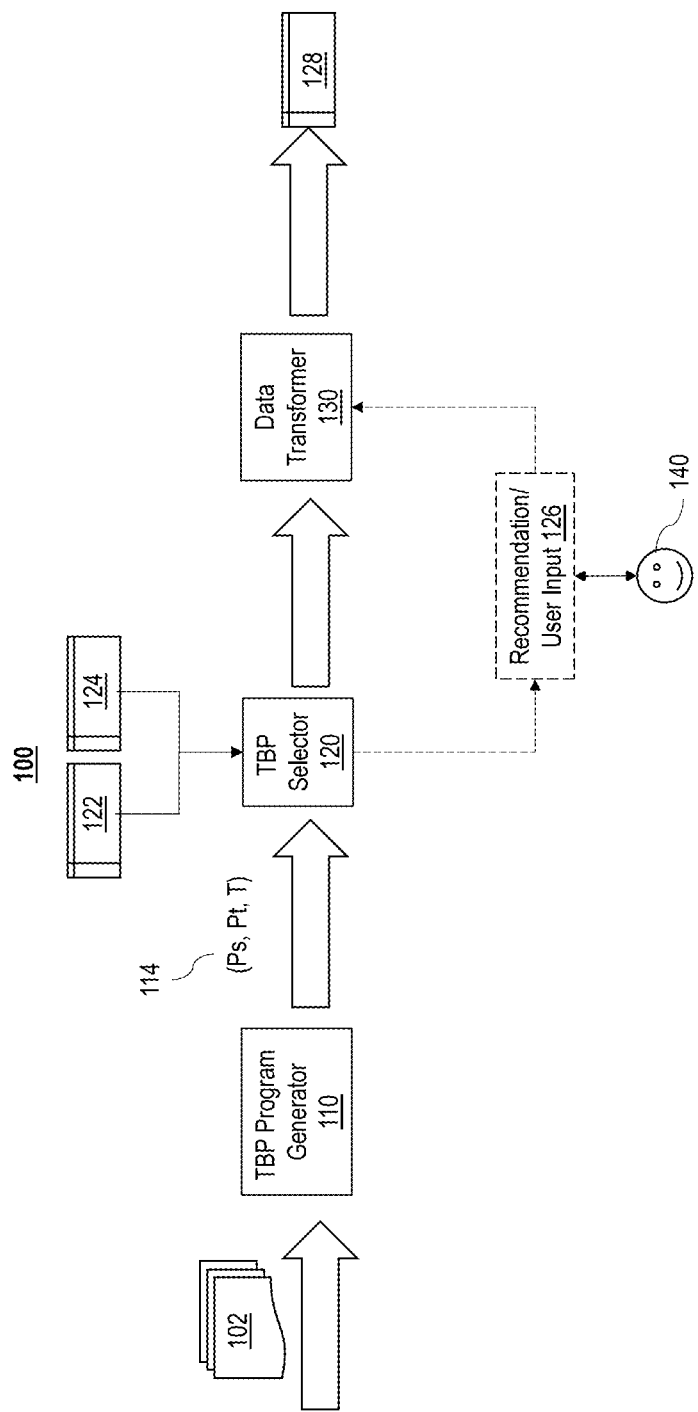
FIG. 1 illustrates an example embodiment of a Transform-by-pattern (TBP) system.

FIG. 1 illustrates an example TBP system 100, including a TBP program generator 110, a TBP selector 120, and a data transformer 130. The TBP program generator 110 obtains various sources 102, including (but not limited to) user query logs of TBE systems, search query logs of search engines, intra-wiki links, and uses these resources 102 to generate multiple TBP programs 114. Each TBP program includes a combination (e.g., a triple) of a source pattern Ps, a target pattern Pt, and a transformation program T, denoted as (Ps, Pt, T). The generated TBP programs 114 are then used by the TBP selector 120 to automatically select one or more applicable TBP programs based on the input source dataset 122 and target dataset 124.

In some embodiments, the TBP selector 120 automatically select one best applicable TBP program and send the selected TBP program to the data transformer 130, which, in turn, automatically transform target data 124 into transformed data 128. In some embodiments, the TBP selector 120 may recommend the selected one or more applicable TBP programs to a user 140 via a user interface 126, the user 140 can then manually select one of the recommended TBP programs to cause the data transformer 130 to transform the target dataset 124 to the transformed data 128. The transformed data 128 may include (but are not limited to) (1) a transformed subset of the target dataset that fits into the source pattern of the selected TBP program, (2) a transformed target dataset including the transformed subset of the target dataset, and/or (3) an integrated dataset including the source dataset and the transformed target dataset.

The TBP programs 114 may be stored in a data structure (e.g., a table) at a service provider's site or in a cloud. FIG. 2 illustrates an example table 200 that stores a list of TBP programs. For example, the first row TBP-1 corresponds to a TBP program with source pattern Ps: "<letter>{3}.<digit>{2}, <digit>{4}" and target pattern Pt: "<digit>{4}-<digit>{2}-<digit>{2}", and a corresponding transformation program T is deserialized in the last column of this row.

FIGS. 3A and 3B illustrate an example source table 300A and an example target table 300B, which may correspond to the source dataset 122 and target dataset 124 of FIG. 1. Each of the source table 300A and target table 300B contains telemetry information, such as time-stamp, cellular-device-numbers, geo-coordinates. As is often the case in the real world, the source table 300A and the target table 300B are formatted differently, because the data may come from different versions of programs or devices. Such two datasets, each of which is in a different format, often need to be integrated into a same format and/or into a single table. Thus, transformation is required to unify or standardize the data in different formats. Currently, when such a transformation is required, data engineers often need to write ad-hoc transformation scripts for each identified incompatibility issue. Alternatively, the user needs to manually enter a few input/output examples into a TBE system to cause a TBE system to transform a target column in the target table based on the entered examples.

The TBP selector 120 described herein solves the above-mentioned problem by automatically selecting one or more applicable TBP programs from a repository of TBP programs, like that illustrated in FIG. 2. The data transformer 130 can then automatically transform the columns in the target table 300B into the formats of the corresponding columns in the source table 300A, using a selected TBP program. For example, R.timestamp and S.timestamp in FIGS. 3A and 3B need to be merged or unified. Based on the patterns of values in these two columns, it can be suggested that TBP-1 in table 200 is to be used, because TBP-1's Ps="<letter>{3}. <digit>{2}, <digit>{4}" and Pt="<digit>{4}-<digit>{2}-<digit>{2}" match R.timestamp and S.timestamp in FIGS. 3A and 3B, respectively. As such, the TBP selector 120 is capable of proactively suggesting an applicable TBP program for transformation. Similarly, Ps and Pt of TBP-2 and TBP-3 in table 200 of FIG. 2 match (S-phone, R-phone) and (S-coordinates, R-coordinates) in FIGS. 3A and 3B, respectively. The TBP selector may suggest that two additional transformation programs can also be performed. Notably, TBE requires paired examples and is clearly burdensome for such scenarios. Unlike a TBE system, the TBP system described herein can automatically identify an applicable TBP program without any user input of examples.

Additionally, the TBP selector 120 and data transformer 130 can also help to identify and fix inconsistent data values in tables. FIGS. 4A through 4L illustrate many real issues in tables that can be identified and fixed by the TBP selector 120, using the TBP programs shown in table 200 of FIG. 2. For instance, in FIG. 4A, the TBP selector 120 can detect that values in the Date column have two distinct patterns: "<digit>{4}-<digit>{2}-<digit>{2}" (e.g., "1997-06-04") and "<letter>+<digit>{2}, <digit>{4}" (e.g., "January 12, 1997"). These two patterns would match Ps and Pt of a TPB program in table 200, indicating potential data inconsistency. The system can bring this to the user's attention, and propose fixes by applying the corresponding T (e.g., transforming "1997-06-04" to "June 4, 1997").

Further, the TBP system is not only applicable to transforming formats of dates, but also applicable to diverse types of transformation programs, including data in different languages (e.g., Spanish, Chinese, etc.) and different domains (e.g., chemical, financial, etc.). For example, FIGS. 4E, 4G, 4H, and 4L also illustrate examples of data inconsistencies that require transformation programs in languages other than English. Each of these inconsistencies in FIGS. 4E, 4G, 4H, and 4L can also be addressed by the TBP selector 120 and data transformer 130 in a similar manner. For example, the issue in FIG. 4E is fixable by TBP-15 in table 200, and the issue in FIG. 4L is fixable by TBP-16 in table 200, so on and so forth.

The experiments and evaluations performed by inventors suggest that the TBP system described herein not only can detect and fix thousands of real issues like those shown in web page tables across many languages (as illustrated in FIGS. 4A through 4L), but also can auto-detect and repair data inconsistencies and format issues for non-technical users working on spreadsheet data (e.g., Microsoft Excel).

As briefly discussed above, the TBP program generator 110 can learn or generate many high-quality TBP programs via various methods and resources. Additional details of how the TBP programs can be learned or generated will now be discussed. In some embodiments, the query logs of a TBE system may be leveraged. Some TBE systems (such as Transform-Data-by-Example (TDE) system of Microsoft) can be used to obtain telemetry data for over half a million unique TBE tasks submitted by users. When users input/output data sets can be fully logged, the system is capable of identifying common combinations (e.g., input-data-pattern, output-data-pattern, and transformation program), which are likely good TBP programs.

However, in many situations (e.g., due to privacy laws or internal product policies), users' input/output data sets may not be fully logged. In such a case, alternative or additional approaches may be implemented to learn or generate TBP programs. In some embodiments, TBP programs may be learned from a large collection of related tables. For example, table columns with related content may be automatically "linked" together, and content redundancy can be used to "learn" common transformation programs.

Figure 5:
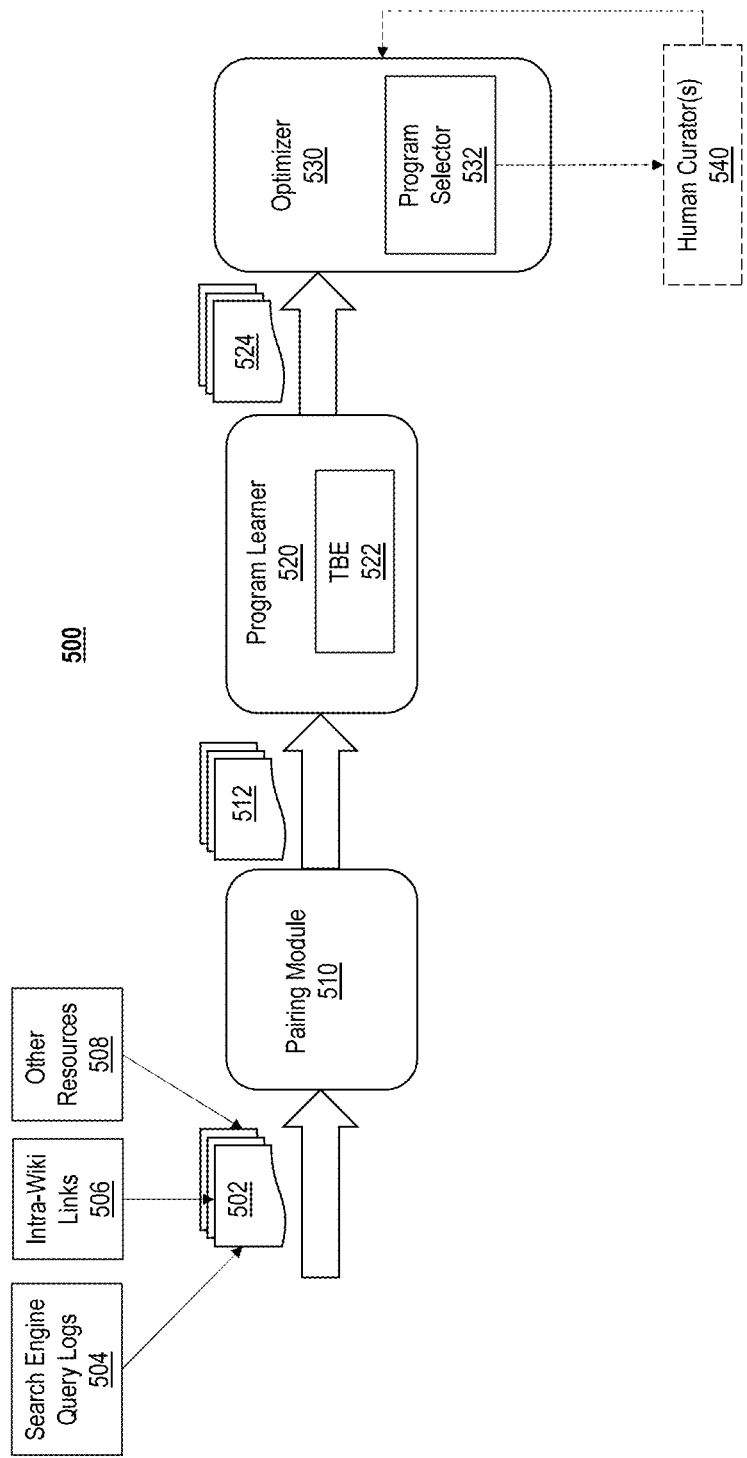
FIG. 5 illustrates an example architecture of a TBP program generator that is configured to learn TBP programs from various resources.

FIG. 5 illustrates an example architecture of the TBP program generator 500, which may correspond to the TBP program generator 110 of FIG. 1. The TBP program generator 500 includes a pairing and linking module 510 (hereinafter also referred to as "pairing module"), a program learner 520, and an optimizer 530. The pairing and linking module 510 has access to a plurality of related datasets 502. The plurality of related datasets 502 may be obtained from query logs 504 of search engine(s), intra-wiki links 506, and/or other resources 508 (e.g., user content).

The pairing module 510 then pairs subsets of the related datasets and links the data units between the related subsets. For example, when the related datasets may be related tables, the pairing module 510 is configured to pair the related tables, related columns, and link the rows between the related columns. These related rows in the linked columns 512 are then fed into the program learner 520. The program learner 520 may then leverage a TBE system 522 to generate patterns that represent the columns and generate transformation programs that are applicable to the linked columns. The generated patterns and transformation programs are then enumerated as combinations (e.g., triples) 524, each of which includes a source pattern, a target pattern, and a transformation program. These enumerated combinations 524 are the candidate TPB programs. The candidate TBP programs 524 are then fed into the optimizer 530 to identify suitable TBP programs and/or high-quality TBP programs.

In some cases, high accuracy (e.g., near 100% accuracy) is required. In such a case, the optimizer 530 may also include a program selector 532 that selects a predetermined number of high-quality TBP programs and sent the selected TBP programs to human curator(s) 540. The human curator(s) 540 may verify each of the predetermined number of high-quality TBP programs and labels each of them as correct or incorrect. The optimizer 530 may then update its depository of TBP programs based on the labels generated by the human curator(s) 540.

As briefly described above, search engine query logs 504 and/or intra-wiki links 506 may be used to obtain related tables. Additional details of how the pairing module 510 may use search engine query logs 504 and/or intra-wiki links 506 to identify related tables, pair related columns and/or link related rows will be further discussed below with respect to FIGS. 6 through 13.

Search engine query logs may be leveraged to obtain related tables, because search result pages returned in a search engine for the same keyword query often contain related tables. To leverage search results, query logs 504 of one or more commercial search engines may be accessed. Amongst all the queries, the table-intent queries may be identified. A table-intent query is a data-seeking query, such as "list of U.S. presidents", "list of national parks", "list of chemical elements", etc. The identifying of the table-intent queries may be performed by a production classifier. There may be a large number of table-intent queries (e.g., several millions) that can be identified. The obtained table-intent queries are denoted by Q.

Figure 6:
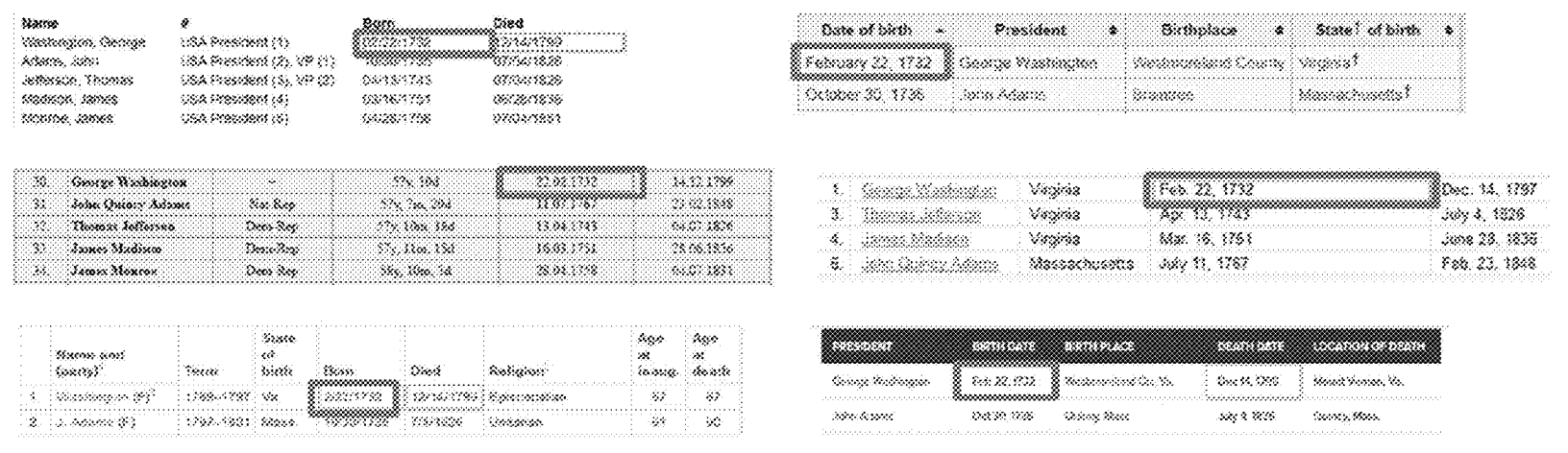

In some embodiments, for each query q ∈Q, the pairing module 510 may retrieve some or all web tables in the top several (e.g., top 20) pages returned by the search engine, denoted by Tq. Tq contains tables related to query q. For example, FIG. 6 illustrates a set of example tables that are retrieved for the query "list of U.S. presidents." Such tables Ta can then be paired to produce table-pairs $P_Q = \{(T, T') | T \in T_q, T' \in T_q, T \neq T', q \in Q\}$.

Further, for a given pair (T, T') ∈$P_Q$, the pairing module 510 also generates row-level "links" between T and T'. For example, the first row of the top-left table of FIG. 6 corresponds to the first row of the top-right table, etc. In an ideal setting, such row-level links can be obtained by equi-join on key-columns.

However, when values are coded or formatted differently between tables, equi-join may fail. As illustrated in FIG. 6, the names of presidents are formatted differently in different tables, which would cause equi-join to fail. To solve the problem of the format variations in the key-columns (e.g., columns of the names of presidents in the tables of FIG. 6), an existing auto-join system may be leveraged to automatically identify join relationships.

In some cases, given (T, T')∈$P_Q$, two left-most non-numeric columns from T and T' are likely include key columns. Thus, the two left-most non-numeric columns from T and T' are taken to invoke the "auto-join" to find possible joins (or linked rows). For example, the two tables at the top of FIG. 6, a join-program may be inferred to link values of "Washington, George" and "George Washington" together by (1) splitting names from the first table by comma (producing an array ["Washington", "George"]); (2) flipping and concatenating the two components with an empty space (producing "George Washington"). Results from this join-program on the "Name" column in the left table produces {"George Washington", "John Adams", . . . }, which can then be equi-joined with the right table, producing 1:1 joins for most rows.

In some cases, the left-most non-numeric column of a table may not be a key column. In such a case, each column of the first table and each column of the second table is paired. The relationship between each pair of columns is then identified. For example, for the top two tables in FIG. 6, (C, C') column pairs such as (Name, Date-of-birth), (#, Date-of-birth), (Born, Date-of-birth), etc. may be produced. Similarly, this process may repeat to allow joining/linking of rows between other table pairs in FIG. 6.

The tables in FIG. 6 are merely example set of related tables that can be found from search engine query logs. Many additional related tables may be identified from the search engine query logs. This process may repeat on those additional related tables to produce a large number (e.g., many million) of column pairs. For each table pair (T, T')∈$P_Q$ that is now linked at a row-level, pairs of columns can then be enumerated in (T, T'), written as $C_Q$={(C, C')|(T, T')∈$P_Q$, C∈T,C'∈T'}.

Alternatively, or in addition, the pairing module 510 may also leverage intra-Wiki cross-language links to pair columns. Wiki pages have extensive intra-Wiki links pointing to other related Wiki pages. Wiki is a piece of server software that allows users to freely create and edit Web page content using any Web browser. Wiki supports hyperlinks and has a simple text syntax for creating new pages and intra-Wiki links between internal pages on the fly. A special form of the intra-Wiki links is the cross-language links.

Figures 7A, 7B:
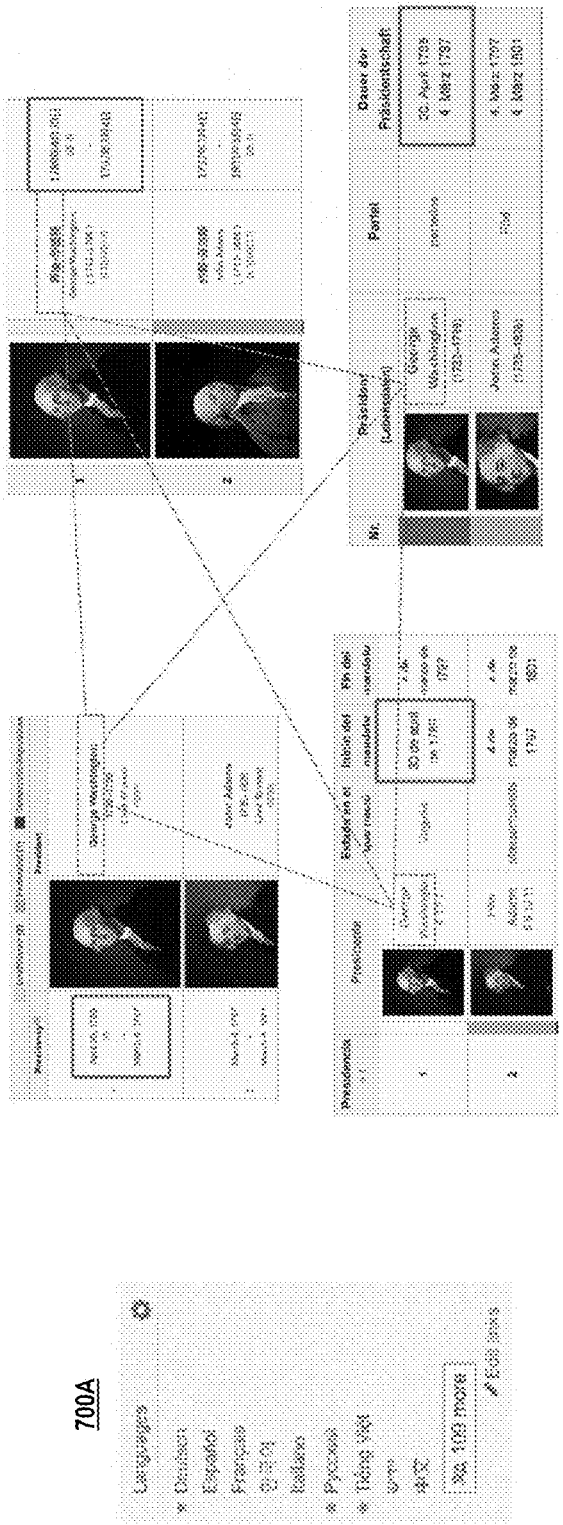
FIG. 7A illustrates an example wiki page that includes multiple cross-language links, each of which points to a similar page written in a different language.
FIG. 7B illustrates several example pages, each of which is linked by one of the cross-language links in FIG. 7A.

FIG. 7A illustrates example cross-language links on a wiki page 700A related to "list of U.S. presidents." The wiki page 700A includes multiple cross-language links, each of which points to a similar page written in a different language. As illustrated in FIG. 7A, the cross-language links point to similar pages written in 109 other languages.

Each of such wiki page p, containing cross-language links, has a list of links on the left side-bar pointing to wiki pages with the same content as p but written in other languages. Many wiki pages from a crawl can be parsed to identify many cross-language links to produce $L_{link}$={(p, p')} that records all pairs of page p, p' linked by cross-language links, from which the system can again produce pairs of related tables. $P_{wiki}$={(T, T')|T∈p,t'∈p', (p, p')∈$L_{link}$}. Each produced pair (T, T') will likely have the same content in different languages.

FIG. 7B illustrates several example pages, each of which is linked by one of the cross-language links of FIG. 7A. As shown in FIG. 7B, each table has the same content in different languages, including English, Chinese, Spanish, and German.

Furthermore, given table pairs (T, T')∈$P_{wiki}$, cross-language links can then be leveraged for a second time to identify row-level links between (T, T'). Specifically, for each table in a given language (e.g., English, Chinese, etc.), the presidents' names are all links pointing to Wiki entity pages of these presidents in that same language. For example, the first row of the top two tables in FIG. 7B links to the Wiki entity page of "George Washington" in English and Chinese, respectively, denote as $p_{gw}^{en}$ and $p_{gw}^{zh}$. These two pages $p_{gw}^{en}$ and $p_{gw}^{zh}$ are again linked by cross-language links, or ($p_{gw}^{en}$, $p_{gw}^{zh}$)∈$L_{link}$, which allows the paring module 510 to determine that the two first rows should be linked together. Similarly, links for other rows can also be produced, as shown in dotted lines in FIG. 7B.

The pairing module 510 may focus on language-pairs between English and the other languages (e.g., en-es, en-de, etc.). The pairing module 510 may repeat this process and produce a large number (e.g., several million) of table pairs across languages. Similarly, from $P_{wiki}$, paired columns can again be enumerated as $C_{wiki}$={(C, C')|(T, T')∈$P_{wiki}$, C∈T, C'∈T'}, (values in (C, C') are paired based on two-level links). Example of $C_{wiki}$ include pairs of different "time-in-office" columns shown in FIG. 7B. As described above, another large set (e.g., millions) of column pairs $C_{wiki}$ may be obtained from intra-Wiki links.

In addition to columns in related tables, in some cases, column pairs within a same table may also have programmatic relationships. Each of FIGS. 8A and 8B illustrates an example tables 800A and 800B, each of which includes related columns. Such column pairs extracted from a same table can be represented as $C_T$={(C, C')|T∈T, C∈T,C'∈T, C≠C'} where T is the corpus of many web tables. Since such column-pairs are from the same table, these column-pairs are already linked at a row-level. Such a method can also generate a large number of column pairs (e.g., over 1 billion).

These column pairs (C, C'), generated from the above-described process (which may be denoted by C=$C_Q$∪$C_{wiki}$∪$C_T$), may then be populated into a table. FIG. 9 illustrates an example table 900 that records multiple input columns (C) of a target table and output columns (C') of a source table. As illustrated in table 900, values in C and C' may be ordered based on row-level links from the previous step. Also, not all (C, C') column-pairs exhaustively enumerated have programmatic relationships. For example, CCT-9 includes a column pair (name, date of birth). The column "name" and the column "date of birth" does not have any programmatic relationship. Such column pairs may simply be ignored.

Given the paired-columns from the resulting column pairs generated from the above-described process, the program learner 520 can then invoke a TBE system 522 to find out whether there are any programmatic relationships.

Figure 10:
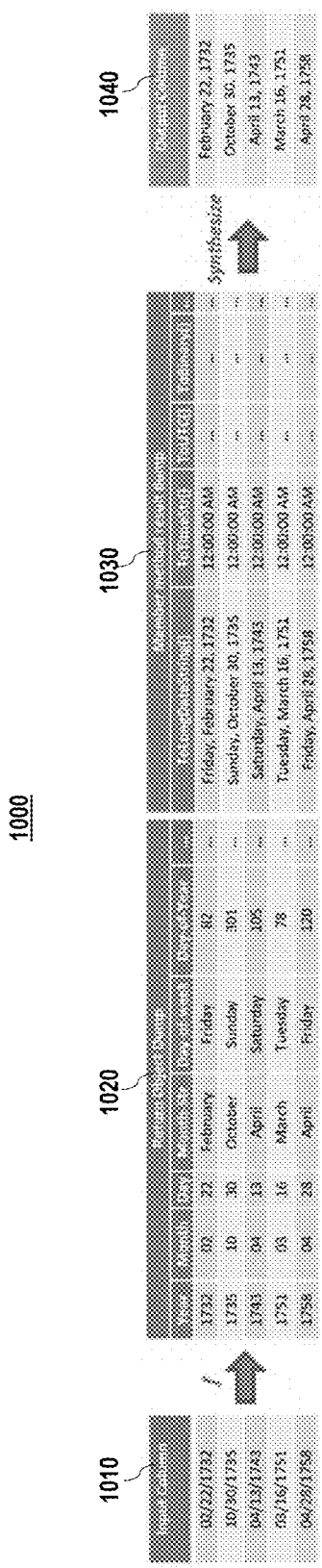
FIG. 10 illustrates an example process of how a TBE system may synthesize a transformation program that can transform each value in a target column to a value that fits into a pattern of a source column.

The TBE system 522 may be capable of indexing and leveraging a collection of functions crawled from code deposits (e.g., github) to synthesize complex programs. FIG. 10 illustrates an example process 1000 of how a TBE system 522 (e.g., TDE of Microsoft) may synthesize a program that can transform each value in the column "Born" 1010 (shown on the left) to match a corresponding value in the column "Date of birth" 1040 (shown on the right).

In this example, the TBE system 522 identifies a function in its index called DateTime.Parse(String) as a promising candidate and invokes the function with each input value in "Born" as a parameter (e.g., DateTime.Parse("02/22/1732"). For each input value, invoking DateTime.Parse(String) produces a DateTime object, which has attributes, Year, Month, and Day that are populated with relevant values. These values can be seen in the table 1020 of FIG. 10. From the table 1020, the system can then leverage program-synthesis techniques to "piece-together" relevant parts to exactly match the target output for every single input value. The pieced-together parts are shown in table 1030 of FIG. 10. Let ret be the object returned from invoking DateTime.Parse (String), A synthesized program T perform the following steps:

(1) Take ret.Month-Str;
(2) Concatenate (1) with an empty-space "|_|";
(3) Concatenate (2) with ret.Day;
(4) Concatenate (3) with ", |_|"; and
(5) Concatenate (4) with ret.Year.

Example source code 1100 corresponding to the above synthesized program (also referred to as Listing 1) is shown in FIG. 11.

Similarly, for each column pair (C, C'), a program T may be synthesized or learned. The learned T is populated in the corresponding entry in the table 900 of FIG. 9. For example, listing 1 is populated for each of CCT-1 and CCT-4. The collection of (C, C', T) combinations 524 is referred to as $T_{CCT}=\{(C,C', T)\}$, which is then fed into the optimizer 530.

Figure 12:
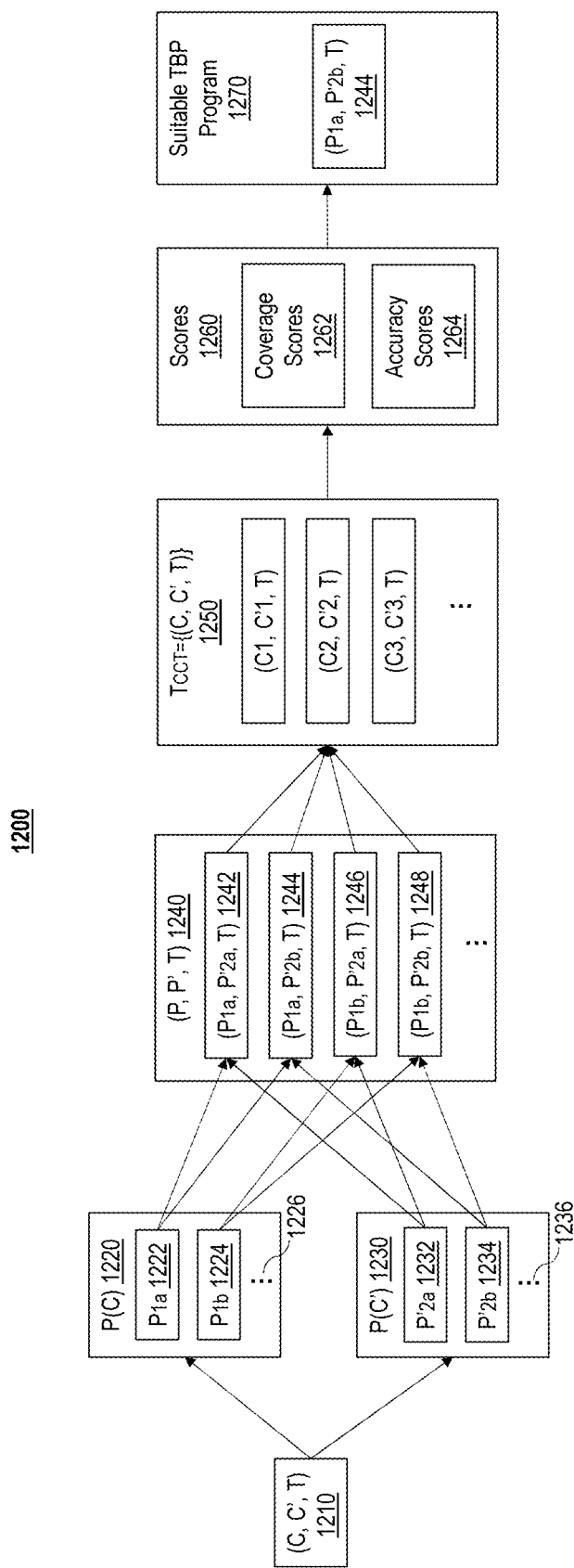
FIG. 12 illustrates an example process for generating candidate TBP programs and identifying suitable TBP programs amongst the candidate TBP programs.

The optimizer 530 is tasked to identify suitable TBP programs and/or high-quality TBP programs amongst the candidate TBP programs. FIG. 12 illustrates an example process 1200 for generating TBP programs from the column pair combinations $T_{CCT}=\{(C,C',T)\}$. To identify candidate TBP programs amongst the collection of $T_{CCT}=\{(C,C',T)\}$ combinations, pattern-profiling may be performed. Various pattern languages (such as regex pattern language) may be implemented to enumerate these patterns.

As illustrated in FIG. 12, given a single combination (C, C', T) 1210, there are many possible patterns P(C) 1220 and P(C') 1230 for C and C', respectively. In some embodiments, for a given column C, all or multiple possible patterns $P_{1a}$ 1222, $P_{1b}$ 1224 may be enumerated. The ellipsis 1226 represents that there may be any number of possible patterns P being enumerated. Similarly, for a given column C', all or multiple possible patterns $P'_{2a}$ 1232, $P'_{2b}$ 1234 may be enumerated. The ellipsis 1236 represents that there may be any number of patterns P' being enumerated.

For each P in P(C) and each P' in P(C'), a TBP program (P, P', T) may be enumerated as a candidate TBP program. For example, given patterns $P_{1a}$ 1222 and $P'_{2a}$ 1232, a candidate TBP program $(P_{1a}, P'_{2a}, T)$ 1242 may be enumerated. Similarly, given patterns $P_{1a}$ 1232, $P'_{2b}$ 1234, a TBP program $(P_{1a}, P'_{2b}, T)$ 1244 may be enumerated. This process may repeat until all the candidate TBP programs 1240 are enumerated.

However, not all patterns in P(C) 1220 and/or P(C') are equally suitable for TBP. One of the key challenges of the optimizer 530 is to pick the right P∈P(C) and P'∈P(C'), so that the resulting (P, P', T) becomes a suitable TBP program.

For example, considering row CCT-1 in the table 900 in FIG. 9 again, the input column C1={"02/22/1732", "10/10/1735", ... }, the possible patterns that can be generated in P(C1) include (but are not limited to): $P_{1a}$ "<digit>{2}/<digit>{2}/17<digit>{2}"; or an even more general $P_{1b}$="<digit>{2}/<digit>{2}/<digit>{4}"; or an even more general $P_{1e}$="<num><symbol><num><symbol><num>", among many other options. Here "<digit>" Stands for [0-9], "<num>" stands for both integer and floating-numbers, "<symbol>" Stands for any punctuation, and "<letter>" Stands for [a-z, A-Z].

Notably, the ideal way to generalize CCT-1 into a TBP program is to use the second option $P_{1b}$="<digit>{2}/<digit>{2}/<digit>{4}" to describe column C1, because it would match other similar columns for which the same transformation in Listing 1 1100 is also applicable (e.g., column C4 of CCT-4 in the table 900). In comparison, using a less general pattern like $P_{1a}$ would lead to reduced applicability, and using a more general pattern like Pic would trigger the system to apply the program to certain non-applicable columns (e.g., phone numbers like 425-880-8080), thus produce false-positives. As such, only $P_{1b} \in P(C_1)$ generalizes values in C1 into the right level for TBP, because it strikes the right balance between generality and accuracy in the context of this TBP program.

Similarly, many patterns P(C'$_1$) can be generated in CCT-1, such as $P_{2b}$="<letter>+<digit>{2},<digit>{4}", which generalizes at the right level and is more suitable choice for this TBP program.

While it is hard to know what candidate TBP programs are suitable by only looking at one (C, C', T) combination, it would become possible when a large collection of combinations or triples $T_{CCT}$ 1250 is available. For example, for CCT-1, assuming $P_{1b} \in P(C_1)$ and $P_{2b} \in P(C'_1)$ are picked, and a candidate TPB program $TBP_{1b}=(P_{1b}, P_{2b}, Listing-1)$ is produced. If the candidate $TPB_{1b}$ is applied across combinations in $T_{CCT}$, additional evidence can be found to prove that $TPB_{1b}$ is good, because in CCT-4, $C_4$ and $C'_4$ are also consistent with $P_{1b}$ and $P_{2b}$. Furthermore, the program T in CCT-4 is also Listing-1, suggesting that $TPB_{1b}$ is also applicable to CCT-4. As such, the system can determine that $TPB_{1b}$ is a suitable program with many such combinations in $T_{CCT}$.

Assuming a large number of combinations (C, C', T)∈$T_{CCT}$ 1250 are found, and for each of the large number of combinations 1250, $P_{1b}$ matches C, and $P_{2b}$ matches C'. Intuitively, these are the column-pairs for which $TBP_{1b}$ could trigger. If it is found that majority of the total combinations have the same program Listing-1, the finding would indicate that $TBP_{1b}$ has a good coverage. For example, if a total number of combinations may be 800, and 600 of these 800 combinations have the same program Listing-1, the accuracy would be 600/800, which indicates that $TBP_{1b}$ has high coverage and high accuracy.

A second candidate $TBP_{1a}$ ($P_{1a}$, $P_{2b}$, Listing-1) uses a less general pattern $P_{1a}$="<digit>{2}/<digit>{2}/17<digit>{2}". If it is found that $TBP_{1a}$ is only applicable to 10 combinations amongst the 800 combinations, the finding suggests that $TBP_{1a}$ has low coverage. A third candidate $TBP_{1c}=(P_{1c}, P_{2b},$ Listing-1) uses a more general pattern $P_{1c}$="<num><symbol><num><symbol><num>". The two patterns $P_{1c}$ and $P_{2b}$ are applied to a large number of column pairs (C, C') in $T_{CCT}$. If it is found that $TBP_{1c}$ is only applicable to 600 pairs amongst 10000 pairs, the finding suggests that $TBP_{1c}$ has the same coverage 600, but low accuracy (600/10000).

The above examples show that a global analysis of $T_{CCT}$ can help identify suitable patterns for TBP. The coverage of a TBP program (P, P', T) on a given $T_{CCT}$ may be denoted as Cov(P, P', T), which may be defined as Equation (1) below:

$$Cov(P,P',T)=|\{(C,C',T)|(C,C',T) \in T_{CCT}, P \in P(C), P' \in P(C'), T=T'\}| \quad \text{Eq. (1)}$$

Cov(P, P', T) represents the number of combinations in $T_{CCT}$, where P matches C (P∈P(C)), P' matches C'(P'∈P (C')), and T is applicable.

The accuracy of a TBP program (P, P', T) given $T_{CCT}$ may be denoted as Acc(P, P', T), which may be defined as Equation (2) below:

$$Acc(P, P', T) = \frac{Cov(P, P', T)}{|\{(C, C', T) \mid (C, C', T) \in T_{CCT}, P \in P(C), P' \in P(C')\}|} \quad \text{Eq. (2)}$$

Acc(P, P', T) measures the fraction of column pairs matching P and P', for which T is actually applicable.

Referring to FIG. 12 again, for each candidate TBP program 1240, a score 1260, including (but not limited to) a coverage score 1262 Cov(P, P', T) and/or an accuracy score 1264 Acc(P, P', T), can be determined. Based on the determined score(s) 1260, a suitable TBP program 1270 may then be identified. For example, in some embodiments, a TBP program that has the coverage score and/or accuracy score greater than a predetermined threshold may be identified as a suitable TBP program. In some other embodiments, a TBP program that has the highest coverage score and/or accuracy score may be identified as the suitable TBP program. Alternatively, or in addition, a combination of the coverage score 1252 and accuracy score 1264 may be considered to determine the suitable TBP programs. It is proven that these estimated coverage and accuracy scores are consistent with high-quality TBPs harvested from search-engine-like settings or fully available logged user data sets.

However, in some cases, the coverage scores may indicate a reasonable indicator of program popularity, but accuracy scores may indicate an inaccurate TBP. For example, when columns are auto-paired in FIG. 6, the "Died" column and the "Date of birth" column would also be paired, producing a combination CCT-3 shown in the table 900 in FIG. 9. Since there is no relationship between the two columns in CCT-3, no program can be learned. However, because the columns in CCT-3 have identical patterns as those in CCT-1, the patterns of the candidate TBP program may be applicable to the source column and target column, and a reasonable coverage score may be generated, even though no transformation program should be applicable.

To further solve the above-mentioned problem, a directed graph may be used to identify special relationships amongst many candidate TBP programs. The candidate TBP programs in $T_{CCT}$ may be modeled using a directed graph G=(V, E), where each pattern P corresponds to a vertex $V_P \in V$, and each candidate program (P, P', T)∈$T_{PPT}$ corresponds to a directed edge $E_{PP'T} \in E$ that connects vertex $V_P$ to $V_{P'}$. Notably, the graph G is a directed graph because TBP programs are directional (e.g., T converts data in pattern P to pattern P', but not in the other direction).

Figure 13:
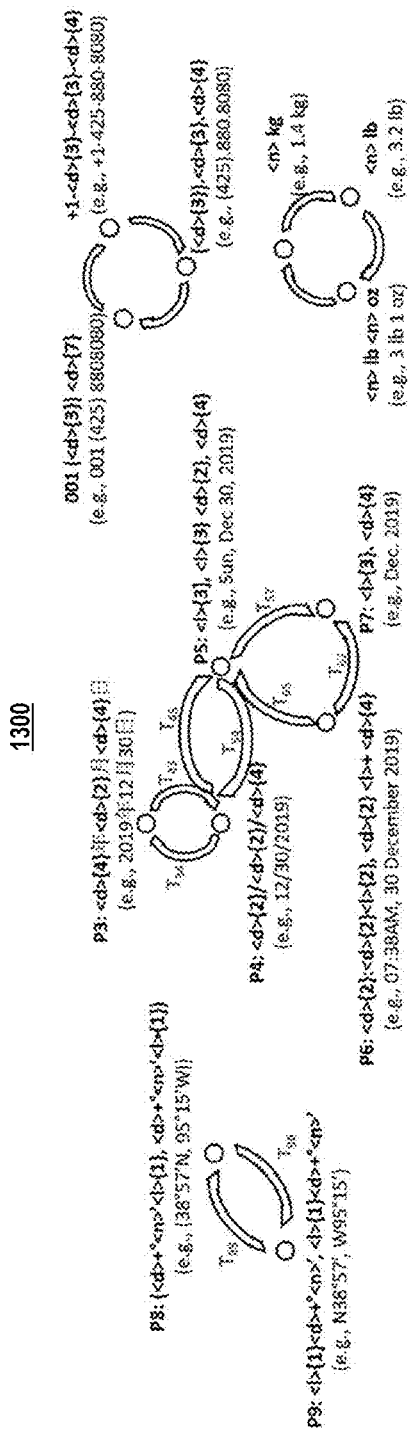
FIG. 13 illustrates an example directed TBP graph, in which each vertex corresponds to a source pattern or a target pattern, and each edge corresponds to a candidate or suitable TBP program.

FIG. 13 illustrates an example directed TBP graph 1300 including a plurality of vertices and edges. Each vertex here corresponds to a source pattern or a target pattern, and each edge corresponds to a candidate TBP program. There can be multiple edges between vertices (making it a directed multigraph), because multiple candidate programs may be generated between two patterns (though some of which are incorrect). In FIG. 12, such incorrect programs have been omitted to avoid clutter.

The TBP graph is then used to identify special types of implicit relationships (and/or corroborations) between TBP programs to infer their quality. One type of special relationship is referred to as lossless inverse programs (also called inverse programs). The definition of inverse programs is defined as follows. Two TBP programs (P, P', T) and (P', P, T') are lossless inverse programs, if applying T on column C matching P (or P∈P(C)) produces T(C) of pattern P', from which applying T' produces the original input C, or T'(T (C))=C.

Inverse programs are similar in spirit to the notion of inverse-functions in mathematics, and such pairs can be denoted as (P, P', T) and (P', P, T$^{-1}$). If after applying T and T' sequentially, the original input data C is obtained, it is a good indication that (1) both T and T' are lossless transformation programs (for otherwise one could not regenerate an identical C); and (2) both T and T' are likely high-quality TBP transformation programs (because of the existence of an independently generated counter-party).

In the example graph 1300 in FIG. 13, many pairs of inverse programs can be identified, such as ($P_8$, $P_9$, $T_{89}$) and ($P_9$, $P_8$, $T_{98}$) for geo-coordinates, and the pair ($P_4$, $P_5$, $T_{45}$) and ($P_5$, $P_4$, $T_{45}$) for date-time strings, among many others. It can be verified that such transformation programs are lossless, because executing T and T$^{-1}$ produces output identical to the input. For instance, from $P_5$ to $P_4$ and applying $T_{54}$, even though some tokens are dropped (e.g., from "Sun, Dec 30, 2019) to "12/30/2019", "Sun" and "Dec" are dropped), it is still lossless because when $T_{45}$ is applied in the other direction, the original input can be regenerated.

Even though the simple graph of FIG. 13 may suggest that inverse programs can be identified as cycles of length 2, in general, this is not sufficient, many two TBP programs of the form (P, P', T) and (P', P, T) may form such a cycle. Whether the inverse-relationship holds on T and T' needs to be tested on real data using the above definition. In some embodiments, when column pairs (C, C') from $T_{CCT}$ for which (P, P', T) is known to hold, such knowledge can be leveraged. (P', P, T) may then be applied in the other direction, by applying T' on each C' to test whether the original C can be recovered. For each candidate pair TBP (P, P', T) and (P', P, T'), a test can be performed on $T_{CCT}$ to compute a success rate for inversion. The success rate is denoted by $S_{inv}$((P, P', T), (P', P, T')), which may be defined in Equation (3) below.

$$S_{inv} = \frac{|\{(C, C', T) \in T_{CCT}, P \in P(C), P' \in P(C'), T'(T(C)) = C\}|}{|\{(C, C', T) \in T_{CCT}, P \in P(C), P' \in P(C'), T(C) = C'\}|} \quad \text{Eq. (3)}$$

In some embodiments, (P, P', T) and (P', P, T) are considered to be inverse programs if the inverse relationship test holds on a large fraction of real data tested (e.g., $S_{inv}$>0.8). When two TBP programs are inverse programs, both of the TBP programs may be deemed as high-quality TBP programs.

Another type of special relationship is triangular equivalent programs. Three programs (P, P', T), (P', P'', T') and (P, P'', T'') are defined as triangular equivalent programs, if applying T on column C matching P (or P∈P(C)) produces output T(C), which is identical to applying T' followed by T'' sequentially on C, or T''(T'(C))=T(C).

As illustrated in FIG. 13, a triangle is formed by P5, P6, and P7. The program T67 is lossy, thus it cannot be part of inverse programs. However, applying T67 on suitable input (e.g., 07:38 AM, 30 December 2019) produces output (Dec. 2019) that is identical to applying T65 followed by T57, suggesting a triangular equivalence relationship and making it possible to corroborate the validity of the lossy T65 using other programs.

Similar to inverse-programs, each program-triple (P, P''', T), (P, P', T) and (P', P''', T'') may be tested on column data in $T_{CCT}$. The success rate of such a test is denoted as $S_{tri}$, which may be defined using Equation (4) below:

$$S_{tri} = \frac{|\{(C, C'', T) \in T_{CCT}, P \in P(C), P'' \in P(C''), T''(T'(C)) = C''\}|}{|\{(C, C'', T) \in T_{CCT}, P \in P(C), P'' \in P(C''), T(C) = C''\}|} \quad \text{Eq. (4)}$$

In some embodiments, if the test above holds on most column pairs of a program triple from $T_{CCT}$ (e.g., $S_{tri}>0.8$), the program triple may be deemed as triangular-equivalence. In such a case, all three involved TBP programs are deemed as high-quality as they can corroborate each other's validity.

Inverse programs and triangular equivalent programs are merely two examples of special relationships amongst programs. Other special relationships may exist amongst multiple programs. Such special relationships, including (but not limited to) inversion and triangular equivalence, can be used to identify high-quality TBP programs. When high accuracy of TBP programs is not required, these high-quality TBP programs can be automatically applied to the target data set to automatically transform the target dataset to fit into the pattern of the source dataset.

However, in some application scenarios, the accuracy of TBP programs is required to be close to 100%. Accuracy is often especially important in settings of enterprise software. In such a case, the harvested TBP programs may be further verified by human curators. In some embodiments, human curator(s) are tasked to inspect and verify up to k high-quality programs, and label them as correct or incorrect. In such a case, the optimizer 530 may further include a program selector 532. The program selector 532 is tasked to select k high-impact and high-quality TBP programs and sends the selected k TBP programs to the human curator(s). The optimizer 530 later receives the labels from the human curator(s), indicating whether each of the k TBP programs is correct or incorrect.

One of the key technical challenges is to select programs of high impact for human curators to verify, so that the benefit of the k labels can be maximized. To identify the high impact programs, the system may again use the graph 1300 and start with the edges (i.e., programs) that are determined to be in inverse or triangular-equivalence relationships. Further, each edge or program has a coverage score Cov (P, P', T), indicating the number of input/output column-pairs to which the program is applicable. Generally, coverage scores capture the popularity and/or importance of a program. For example, frequently-used programs often have high coverage scores and should be manually verified first.

Furthermore, because of the relationships amongst programs, verification of one edge may have additional benefits beyond this edge. Referring to FIG. 13 again, in a curation setting, many edges of the graph needs to be verified, and for each of these edges, a coverage score is then determined. If a human curator can verify $T_{89}$ to be correct, then $T_{98}$ is verified implicitly due to their strong inverse relationship. Similarly, if both $T_{65}$ and $T_{57}$ are verified by a human curator as correct, $T_{67}$ is also likely correct because of their triangular-equivalence relationship. Also, the coverage score on $T_{67}$ can be obtained based on the verification result of $T_{65}$ and $T_{57}$.

In some embodiments, the goal of the program selector 532 is to identify a top k edges or programs that have the highest total coverage score. Given a TBP graph G=(V, E), where each edge e∈E has a coverage score Cov(e). The objective is to find a subset of edges $E_s \subset E$ to verify, with $|E_s| \leq k$, such that the total coverage score of these to-be-verified programs, together with ones implicitly verified through program relationships, is maximized. This principle is denoted in a coverage-maximizing program selection (CMPS), which may be defined by the equations (5) through (10) below:

$$(CMPS) \max \Sigma_{e_i \in E} Cov(e_i) v_i \quad \text{Eq. (5)}$$

$$s.t. \Sigma_{e_i \in E} x_i \leq k \quad \text{Eq. (6)}$$

$$y_m \leq x_i + x_j, \forall Inv_m(e_i, e_j) \in Inv(G) \quad \text{Eq. (7)}$$

$$z_n \leq x_i + x_j + x_l - 1, \forall Tri_n(e_i, e_j, e_l) \in Tri(G) \quad \text{Eq. (8)}$$

$$v_i \leq x_i + \Sigma_{e_j \in Inv_m} y_m + \Sigma_{e_j \in Tri_n} z_n, \forall e_i \in E \quad \text{Eq. (9)}$$

$$v_i, x_i, y_m, z_n \in \{0,1\} \quad \text{Eq. (10)}$$

In the above equations (5) through (10), $x_i$ indicates whether $e_i$ is selected for human verification; $y_m$ indicates whether the mth inverse relationship, denoted by $Inv_m$, has a participating edge selected for verification; $z_n$ indicates whether nth triangular equivalence relationship, denoted by $Tri_n$, has more than two edges selected or verification; and $v_i$ indicates whether $e_i$ can be treated as correct, through explicit human verification, or program relationships. All of $v_i$, $x_i$, $y_m$, and $z_n$ are $\{0, 1\}$ binary variables, denoted in Equation (10).

The objective function in Equation (5) calculates the sum of coverage scores of all programs implicitly or explicitly verified (denoted by $v_i$). Equation (6) ensures that at most k edges are explicitly verified by human curators. Equation (7) and equation (8) check whether enough edges in each inverse or triangular relationship are explicitly verified by human curators, and if so the corresponding $y_m$ and $z_n$ is set to 1. Finally, Equation (9) checks whether ci can be verified explicitly through $x_i$ or implicitly through $y_m$ or $z_n$.

It can be proven that the above CMPS problem is super-modular and NP-hard. It can also be proven that the CMPS problem cannot be approximated with $n^{1/polyloglog\ n}$, and no PTAS likely exists under standard complexity theoretic assumptions. Given the hardness of CMPS problem, in the curation setting, the program selector 532 may resort to a heuristic method, in which at each step, the edge with maximum benefit (from explicit and implicit verification) is picked, until the budget k is exhausted.

Additional embodiments may be implemented to formulate the curation problem. In some embodiments, the coverage score of each edge is considered as a set of column-pairs as opposed to a numeric count. Because the column-pairs covered by each program or edge can overlap, this method may reduce the redundancy of verifying related programs. In yet some other embodiments, the estimated program quality may be modeled as the likelihood of the edge verified correct, in addition to using coverage scores.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 14:
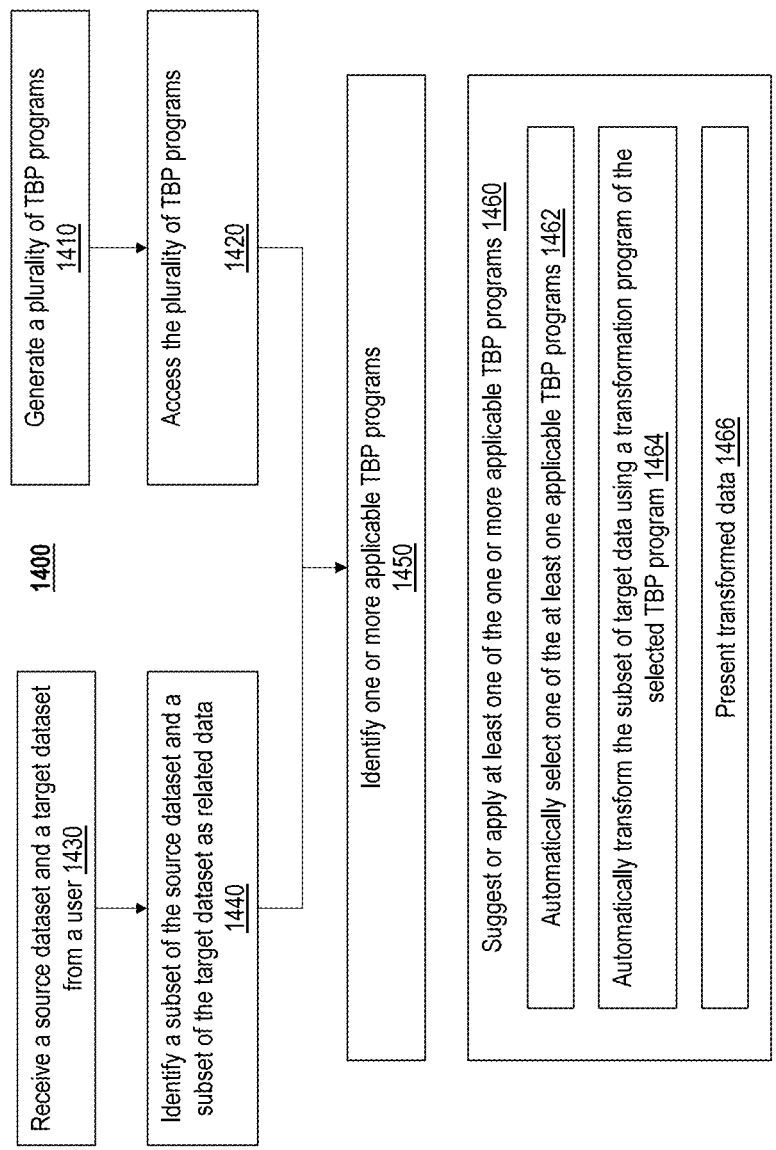
FIG. 14 illustrates a flowchart of an example method for automatically identifying applicable TBP programs for data transformation and/or automatically transforming data using an identified applicable TBP program.

FIG. 14 illustrates a flowchart of an example method 1400 for automatically identifying applicable TBP programs for data transformation and/or automatically transforming data using an identified applicable TBP program. The method 1400 includes generating a plurality of TBP programs (1410) or accessing the plurality of TBP programs (1420). Each TBP program includes a combination of a source pattern, a target pattern, and a transformation program that is configured to transform data that fits into the target pattern into data that fits into the source pattern. The method 1400 also includes receiving a source dataset and a target dataset (1430) and identifying a subset of the source dataset and a subset of target dataset as related data (1440).

Based on the identified related data, and the plurality of TBP programs, one or more applicable TBP programs amongst the plurality of TBP programs are identified (1450). A TBP program is applicable to the related data, if at least one data unit of the subset of the source dataset fits into the source pattern of the TBP program, and at least one data unit of the subset of the target dataset fits into the target pattern of the TBP program.

The method 1400 also includes suggesting or applying at least one of the one or more applicable TBP programs (1460). In some embodiments, the applying at least one of the one or more applicable TBP programs includes automatically selecting one of the at least one applicable TBP programs to the subset of the target dataset (1462), automatically transform the subset of the target dataset using a transformation program of the selected TBP program (1464), and presenting the transformed data to the user (1466). The transformed data may include (but not limited to) (1) a transformed subset of the target dataset that fits into the source pattern of the selected TBP program, (2) a transformed target dataset including the transformed subset of the target dataset, and/or (3) an integrated dataset including the source dataset and the transformed target dataset.

Figure 15:
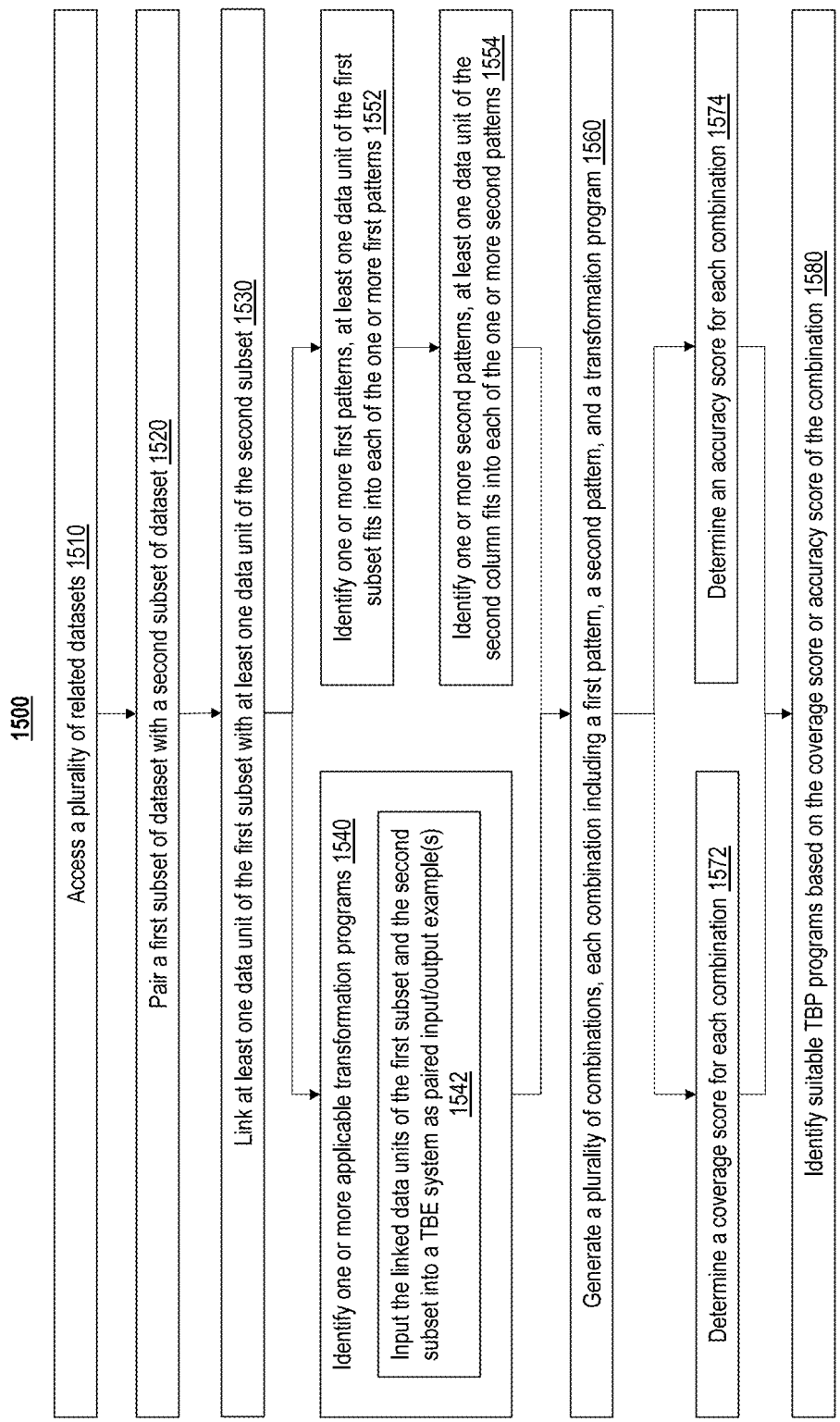
FIG. 15 illustrates a flowchart of an example method for generating a plurality of TBP programs.

FIG. 15 illustrates a flowchart of an example method 1500 for generating a plurality of TBP programs, which may correspond to the act 1410 of FIG. 14. The method 1500 includes accessing a plurality of related datasets (1510). The plurality of related datasets may be obtained based on query logs of search engines and/or various wiki links. The method 1500 also includes pairing two subsets (i.e., a first subset and a second subset) of the related datasets (1520). Each of the two subsets of related datasets may be obtained from a same dataset or a different datasets. The method 1500 also includes link at least one data unit of the first subset with at least one data unit of the second subset of the related datasets (1530). Based on the linked at least one data unit of the first subset and at least one data unit of the second dataset, one or more applicable transformation programs may be identified (1540). In some embodiments, an existing TBE system may be leveraged to identify the one or more applicable transformation programs. In particular, the linked at least one data unit of the first subset and at least one data unit of the second subset may be input into the TBE system as paired input/output example(s) to cause the TBE system to retrieve a transformation program based on the paired input/output example(s) (1542).

The method 1500 also includes identifying one or more first patterns for the first subset (1552). At least one data unit of the first subset fits into each of the one or more first patterns. Similarly, one or more second patterns for the second subset may also be identified (1554). At least one data unit of the second subset fits into each of the one or more second patterns. Based on the one or more first patterns, one or more second patterns, and one or more applicable transformation programs, a plurality of combinations may be generated (1560). Each of the plurality of combinations includes one of the one or more first patterns, one of the one or more second patterns, and one of the one or more applicable transformation programs. Each combination may be a candidate TBP program.

The method 1500 also includes determining a coverage score for each candidate TBP program, indicating the applicability of the corresponding candidate TBP program (1572). For each TBP program, a coverage score may be determined by applying the corresponding candidate TBP program to multiple data units of the first subset and the second subset (e.g., all the rows of columns of tables). For each of the multiple data units, it is determined whether the TBP program is applicable. The coverage score may be determined based on the number of the data units that the transformation program is applicable. Similarly, the method 1500 may also include determining an accuracy score for each candidate TBP program, indicating the accuracy of each candidate TBP program (1574). The accuracy score measures the fraction of first and second subsets matching P and P', for which T is applicable.

Based on the coverage score and/or the accuracy score of each combination, TBP programs may be identified (1580). In some embodiments, when a coverage score and/or an accuracy score of a candidate TBP program is greater than a predetermined threshold (e.g., 80%), the combination is identified to be a suitable TBP program.

Figure 16:
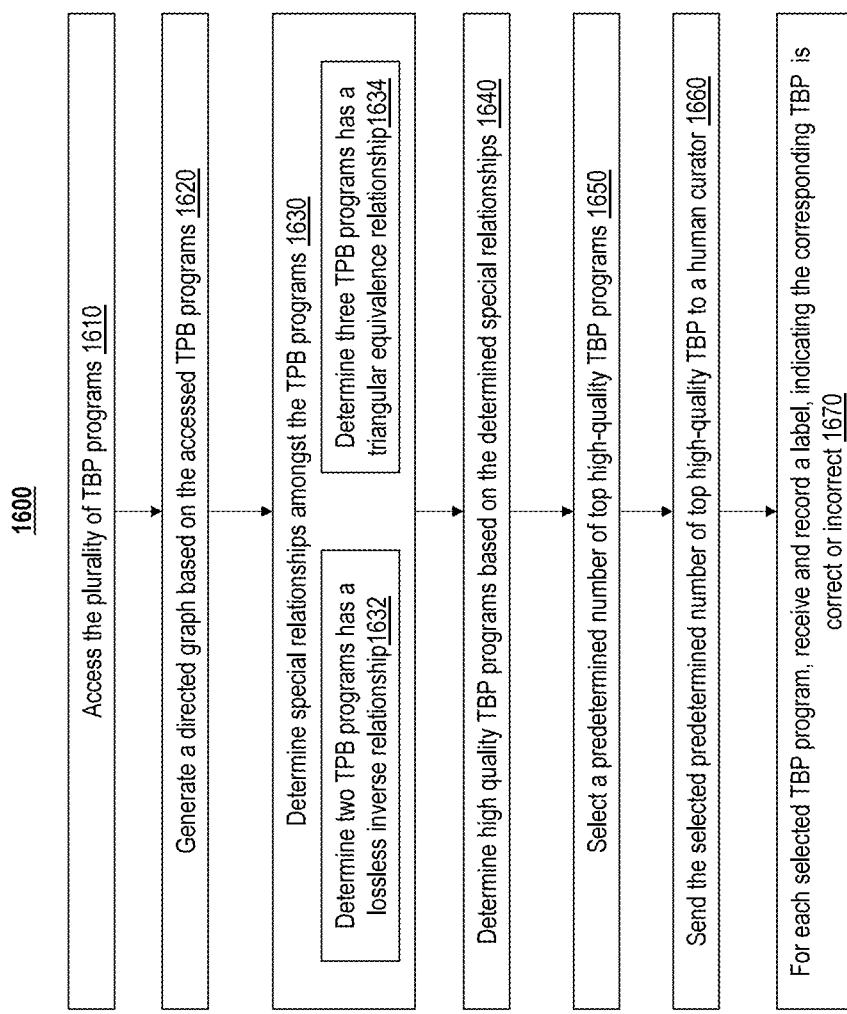
FIG. 16 illustrates a flowchart of an example method for identifying high-quality TBP programs.

FIG. 16 illustrates a flowchart of an example method 1600 for identifying high-quality TBP programs using a directed graph. The method 1600 includes accessing the plurality of TBP programs (1610) and generating a directed graph based on the plurality of TPB programs (1620). The plurality of TBP programs may be candidate or suitable TBP programs. Each of a first pattern and a second pattern of a TBP program corresponds to a vertex of the directed graph, and each of the transformation program corresponding to a directed edge of the directed graph.

Based on the directed graph, special relationships amongst the plurality of TPB programs may be identified (1630). The special relationships include (but are not limited to) lossless inverse relationships between two TBP programs (1632) and/or triangular equivalence relationships among three TBP programs (1634). Based on the determined special relationships, high-quality TBP programs may be identified (1640). For example, each of the two TBP programs that have a lossless inverse relationship may be deemed as high quality, and each of the three TBP programs that have a triangular equivalence relationship may be deemed as high quality.

The method 1600 may also include selecting a predetermined number of top high-quality TBP programs (1650). The selected predetermined number of top high-quality TBP programs may then be sent to a human curator for verification (1660). For each of the selected top high-quality TBP programs, a label, indicating the corresponding TBP is correct or incorrect, may then be received from the human curator and recorded in the repository of the TBP programs (1670).

Finally, because the principles described herein may be performed in the context of a computing system (e.g., the TBP system or some component of the TBP system may be a computing system) some introductory discussion of a computing system will be described with respect to FIG. 17.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 17:
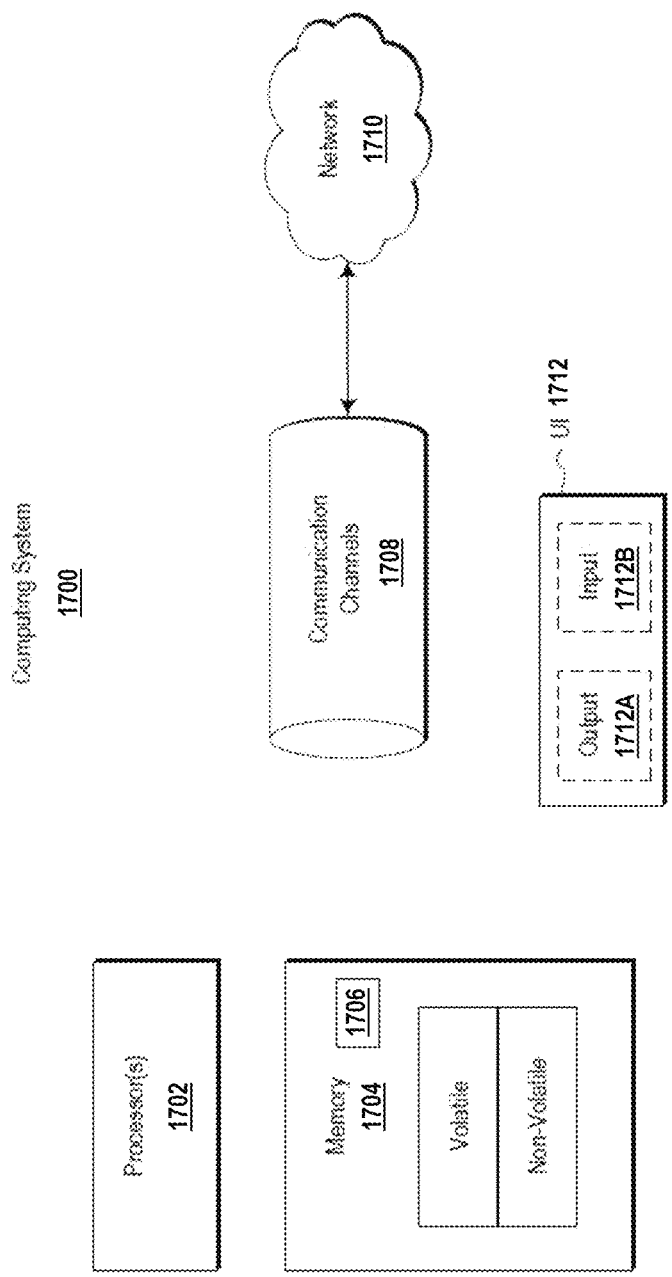
FIG. 17 illustrates an example computing system in which the principles described herein may be employed.

As illustrated in FIG. 17, in its most basic configuration, a computing system 1700 typically includes at least one hardware processing unit 1702 and memory 1704. The processing unit 1702 may include a general-purpose processor and may also include a field-programmable gate array (FPGA), an application-specific integrated circuit (ASIC), or any other specialized circuit. The memory 1704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1700 also has thereon multiple structures often referred to as an "executable component". For instance, memory 1704 of the computing system 1700 is illustrated as including executable component 1706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media. In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1704 of the computing system 1700. Computing system 1700 may also contain communication channels 1708 that allow the computing system 1700 to communicate with other computing systems over, for example, network 1710.

While not all computing systems require a user interface, in some embodiments, the computing system 1700 includes a user interface system 1712 for use in interfacing with a user. The user interface system 1712 may include output mechanisms 1712A as well as input mechanisms 1712B. The principles described herein are not limited to the precise output mechanisms 1712A or input mechanisms 1712B as such will depend on the nature of the device. However, output mechanisms 1712A might include, for instance, speakers, displays, tactile output, holograms and so forth. Examples of input mechanisms 1712B might include, for instance, microphones, touchscreens, holograms, cameras, keyboards, mouse or other pointer input, sensors of any type, and so forth. Embodiments described herein may comprise or utilize a special purpose or general-purpose computing system including computer hardware, such as, for example, one or more processors and system memory, as discussed in greater detail below.

Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 1700 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 1702 and memory 1704, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   at least one processor; and
   at least one hardware storage device that stores instructions that are executable by the at least one processor to cause the computing system to perform the following in response to receiving a source dataset and a target dataset:
   identify a subset of the source dataset and a subset of the target dataset as related data;
   access a plurality of Transform-by-Pattern (TBP) programs, wherein each TBP program in the plurality of TBP programs comprises a combination of (i) a source pattern, (ii) a target pattern, and (iii) a transformation program, wherein the transformation program is configured to transform data that fits into the target pattern into data that fits into the source pattern;

identify one or more of the TBP programs as being applicable to the related data, wherein:
for each of the one or more TBP programs, (i) at least one data unit of the subset of the source dataset fits into the source pattern of the TBP program and (ii) at least one data unit of the subset of the target dataset fits into the target pattern of the TBP program,
the one or more TBP programs are identified based on a determination that corresponding coverage scores for the one or more TBP programs are greater than a predetermined threshold, and the coverage scores indicate applicability rates for the one or more TBP programs, and
a first TBP program included among the one or more TBP programs is learned or generated based on telemetry data obtained in response to leverage of a query log, the telemetry data being associated with a particular type of task and being usable to learn or generate the first TBP program; and
apply at least one of the one or more applicable TBP programs to the target dataset, wherein applying the at least one of the one or more applicable TBP programs to the target dataset includes:
selecting one applicable TBP program; and
using a transformation program of the selected one applicable TBP program to automatically transform the subset of the target dataset to transformed data, the transformed data comprising an integrated dataset comprising the source dataset and the transformed target dataset.

2. The computing system of claim 1, wherein the transformed data comprising comprises at least one of (1) a transformed subset of the target dataset that fits into the source pattern of the selected TBP program or (2) a transformed target dataset including the transformed subset of the target dataset.

3. The computing system of claim 1, the computing system further caused to generate the plurality of TBP programs from at least one of (1) a plurality of user query logs of a Transform-by-Example (TBE) system, or (2) a plurality of related datasets.

4. The computing system of claim 3, wherein:
the plurality of user query logs of the TBE system includes a plurality of pairs of user input dataset and user output dataset,
the computing system is caused to identify one or more TBP programs based on the plurality of pairs of user input dataset and user output dataset, and
for each of the identified one or more TBP programs, at least a pair of user input dataset and user output dataset fit into a respective source pattern and target pattern of the TBP program, and a corresponding transformation program of the TBP program is configured to transform the user input dataset into the user output dataset.

5. The computing system of claim 3, the generating the plurality of TBP programs comprising obtaining the plurality of related datasets based on at least one of (1) a plurality of query logs of a search engine, or (2) a plurality of wiki links.

6. The computing system of claim 3, the generating the plurality of TBP programs from the plurality of related datasets comprising:
pairing a first subset of dataset with a second subset of dataset, each of the first subset of dataset and the second subset of dataset being a subset of a same dataset or different datasets of the plurality of the related datasets;
link at least one data unit of the first subset of dataset with at least one data unit of the second subset of dataset; and
identify one or more transformation programs, each of the one or more transformation programs being applicable to transform at least one of the linked units of the second subset of dataset to the corresponding linked unit of the first subset of dataset.

7. The computing system of claim 6, the identifying one or more transformation programs comprising:
inputting the linked units of the first subset of dataset and the second subset of dataset into a TBE system as paired input/output example(s) to cause the TBE system to generate the one or more transformation programs.

8. The computing system of claim 7, the generating the plurality of TBP programs comprising:
identifying one or more first patterns, for each of the one or more first patterns, at least one data unit of the first subset of dataset fitting into the corresponding first pattern; and
identifying one or more second patterns, for each of the one or more second patterns, at least one data unit of the second subset of dataset fitting into the corresponding second pattern;
wherein for each of the one or more transformation programs, one or more first patterns, or one or more second patterns, a candidate TBP program is formed, the candidate TBP program comprising a corresponding first pattern, a corresponding second pattern, and a corresponding transformation.

9. The computing system of claim 8, the generating the plurality of TBP programs comprising:
for each candidate TBP program,
applying TBP program to a plurality of units of the first subset of dataset and a plurality of units of the second subset of dataset;
generating an accuracy score, the accuracy score indicating an accuracy rate of the candidate TBP program; and
when the accuracy score is greater than a particular predetermined threshold, identifying the candidate TBP program as a suitable TBP program.

10. The computing system of claim 8, the computing system further caused to use the TBP programs to generate a directed graph, each of a first pattern and a second pattern of a TBP program corresponding to a vertex of the directed graph, and each of the transformation program corresponding to a directed edge.

11. The computing system of claim 10, the computing system further caused to determine whether one or more special relationships exist amongst the TBP programs based on the directed graph, and identify one or more TBP programs as high-quality TBP program(s) based on the determined one or more special relationships.

12. The computing system of claim 11, wherein the one or more special relationships include at least one of (1) a lossless inverse relationship between two transformation programs, or (2) a triangular equivalence relationship amongst three transformation programs.

13. The computing system of claim 12, wherein when a lossless inverse relationship between two TBP programs exists, the computing system identifies each of the two TBP programs as a high-quality TBP program.

14. The computing system of claim 13, wherein when a triangular equivalence relationship amongst three TBP programs exists, the computing system identifies each of the three TBP programs as a high-quality TBP program.

15. The computing system of claim 14, the computing system further caused to:
select a predetermined number of top high-quality TBP programs;
send the selected predetermined number of top high-quality TBP programs to a human curator to verify; and
for each of the predetermined number of top high-quality TBP programs, receive and record a label, indicating the corresponding high-quality TBP program is correct or incorrect.

16. The computing system of claim 1, wherein a second TBP program included among the one or more TBP programs is learned or generated by:
determining that a sufficient amount of telemetry data is not currently logged;
identifying a collection of related tables;
identifying, from within the collection of related tables, table columns having related content;
linking the table columns having related content together; and
using content redundancy, which includes the linked columns, to learn the second TBP program.

17. A method implemented at a computing system for automatic transformation data by patterns in response to receiving a source dataset and a target dataset, the method comprising:
identifying a subset of the source dataset and a subset of the target dataset as related data;
accessing a plurality of Transform-by-Pattern (TBP) programs, wherein each TBP program in the plurality of the TBP programs comprises a combination of (i) a source pattern, (ii) a target pattern, and (iii) a transformation program, wherein the transformation program is configured to transform data that fits into the target pattern into data that fits into the source pattern;
identifying one or more of the TBP programs as being applicable to the subset of the source dataset and the subset of the target dataset, wherein:
for each of the one or more TBP programs, (i) at least one data unit of the subset of the source dataset fits into the source pattern of the TBP program and (ii) at least one data unit of the subset of the target dataset fits into the target pattern of the TBP program,
the one or more TBP programs are identified based on a determination that corresponding coverage scores for the one or more TBP programs are greater than a predetermined threshold, and the coverage scores indicate applicability rates for the one or more TBP programs and
a first TBP program included among the one or more TBP programs is learned or generated based on telemetry data obtained in response to leverage of a query log, the telemetry data being associated with a particular type of task and being usable to learn or generate the first TBP program; and
applying at least one of the one or more applicable TBP programs to the target dataset, wherein applying the at least one of the one or more applicable TBP programs to the target dataset includes:
selecting one applicable TBP program; and
using a transformation program of the selected one applicable TBP program to automatically transform the subset of the target dataset to transformed data, the transformed data comprising an integrated dataset comprising the source dataset and the transformed target dataset.

18. The method of claim 17, wherein the transformed data comprises at least one of (1) a transformed subset of the target dataset that fits into the source pattern of the selected TBP program or (2) a transformed target dataset including the transformed subset of the target dataset.

19. The method of claim 17, the method further comprising:
generating the plurality of TBP programs from at least one of (1) a plurality of user query logs of a Transform-by-Example (TBE) system, or (2) a plurality of related datasets.

20. The method of claim 19, the method further comprising:
obtaining the plurality of related tables based on at least one of (1) a plurality of query logs of a search engine, or (2) a plurality of wiki links.

21. One or more hardware storage devices having stored thereon computer-executable instructions that are executable by one or more processors of a computing system to cause the computer system to perform the following in response to receiving a source dataset and a target dataset:
identify a subset of the source dataset and a subset of the target dataset as related data;
access a plurality of Transform-by-Pattern (TBP) programs, wherein each TBP program in the plurality of TBP programs comprises a combination of (i) a source pattern, (ii) a target pattern, and (iii) a transformation program, wherein the transformation program is configured to transform data that fits into the target pattern into data that fits into the source pattern;
identify one or more of the TBP programs as being applicable to the subset of the source dataset and the subset of the target dataset, wherein:
for each of the one or more TBP programs, (i) at least one data unit of the subset of the source dataset fits into the source pattern of the TBP program and (ii) at least one data unit of the subset of the target dataset fits into the target pattern of the TBP program,
the one or more TBP programs are identified based on a determination that corresponding coverage scores for the one or more TBP programs are greater than a predetermined threshold, and the coverage scores indicate applicability rates for the one or more TBP programs, and
a first TBP program included among the one or more TBP programs is learned or generated based on telemetry data obtained in response to leverage of a query log, the telemetry data being associated with a particular type of task and being usable to learn or generate the first TBP program; and
apply at least one of the one or more applicable TBP programs to the target dataset, wherein applying the at least one of the one or more applicable TBP programs to the target dataset includes:
selecting one applicable TBP program; and
using a transformation program of the selected one applicable TBP program to automatically transform the subset of the target dataset to transformed data, the transformed data comprising an integrated dataset comprising the source dataset and the transformed target dataset.

* * * * *